US006944873B2

(12) United States Patent
 Huang

(10) Patent No.: US 6,944,873 B2
(45) Date of Patent: Sep. 13, 2005

(54) SLOT-IN TYPE OPTICAL DISK-LOADING APPARATUS USABLE WITH OPTICAL DISKS OF TWO DIFFERENT STANDARDIZE DIAMETERS

(75) Inventor: Chin-Yi Huang, Tainan (TW)

(73) Assignee: Ya Hong Electronics Co., Ltd., Tainan (TW)

( * ) Notice: Subject to any disclaimer, the term of this patent is extended or adjusted under 35 U.S.C. 154(b) by 174 days.

(21) Appl. No.: 10/682,743

(22) Filed: Oct. 8, 2003

(65) Prior Publication Data

US 2005/0081222 A1 Apr. 14, 2005

(51) Int. Cl.⁷ .......................................... G11B 17/028
(52) U.S. Cl. ................................................ 720/704
(58) Field of Search ............................. 720/704, 624

(56) References Cited

U.S. PATENT DOCUMENTS 5,031,171 A * 7/1991 Kurumada et al. ......... 720/704
5,056,077 A * 10/1991 Morikawa et al. ......... 720/624
2003/0161244 A1 * 8/2003 Yamanaka et al. ......... 369/77.1

* cited by examiner

*Primary Examiner*—George Letscher
(74) *Attorney, Agent, or Firm*—Charles Berman; Greenberg Traurig LLP

(57) ABSTRACT

A slot-in type optical disk-loading apparatus includes first and second housings defining a disk slot. When a large diameter optical disk is inserted into the slot so that it is supported on a roller, a motor is activated to rotate the roller so as to move the optical disk rearwardly. The large diameter optical disk pushes two front limiting members away from each other so that two rear limiting members are removed from a disk path, thereby permitting the large diameter optical disk to move rearwardly into a disk holder unit along the disk path through a space between the front limiting members. When a small diameter optical disk is inserted into the slot, it is moved rearwardly into the disk holder unit through the space between the front limiting members and a space between the rear limiting members.

3 Claims, 26 Drawing Sheets

SLOT-IN TYPE OPTICAL DISK-LOADING APPARATUS USABLE WITH OPTICAL DISKS OF TWO DIFFERENT STANDARDIZE DIAMETERS

BACKGROUND OF THE INVENTION

1. Field of the Invention

This invention relates to a slot-in type optical disk-loading apparatus that can move an optical disk mechanically into a disk holder unit when the optical disk is inserted into a disk slot in the apparatus, and more particularly to a slot-in type optical disk-loading apparatus that is usable with optical disks of two different standardized diameters.

2. Description of the Related Art

Currently, optical disks are classified into large diameter disks and small diameter disks according to standardized disk sizes. Correspondingly, conventional slot-in type optical disk-loading apparatuses are also classified into a first form having a large-size disk slot for engaging fittingly the large diameter optical disks, and a second form having a small-size disk slot for engaging fittingly the small diameter optical disks. As such, the conventional slot-in type optical disk-loading apparatus is usable with only one of the large diameter optical disk and the small diameter optical disk.

SUMMARY OF THE INVENTION

The object of this invention is to provide a slot-in type optical disk-loading apparatus, which can move an optical disk into a disk holder unit when the optical disk is inserted into a disk slot in the apparatus regardless of whether the optical disk is one of a standardized large diameter or a standardized small diameter.

According to this invention, a slot-in type optical disk-loading apparatus includes first and second housings defining a disk slot. When a large diameter optical disk is inserted into the slot so that it is supported on a roller, a motor is activated to rotate the roller so as to move the optical disk rearwardly. The large diameter optical disk pushes two front limiting members away from each other so that two rear limiting members are removed from a disk path, thereby permitting the large diameter optical disk to move rearwardly into a disk holder unit along the disk path through a space between the front limiting members. When a small diameter optical disk is inserted into the slot, it moves rearwardly into the disk holder unit through the space between the front limiting members and a space between the rear limiting members.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
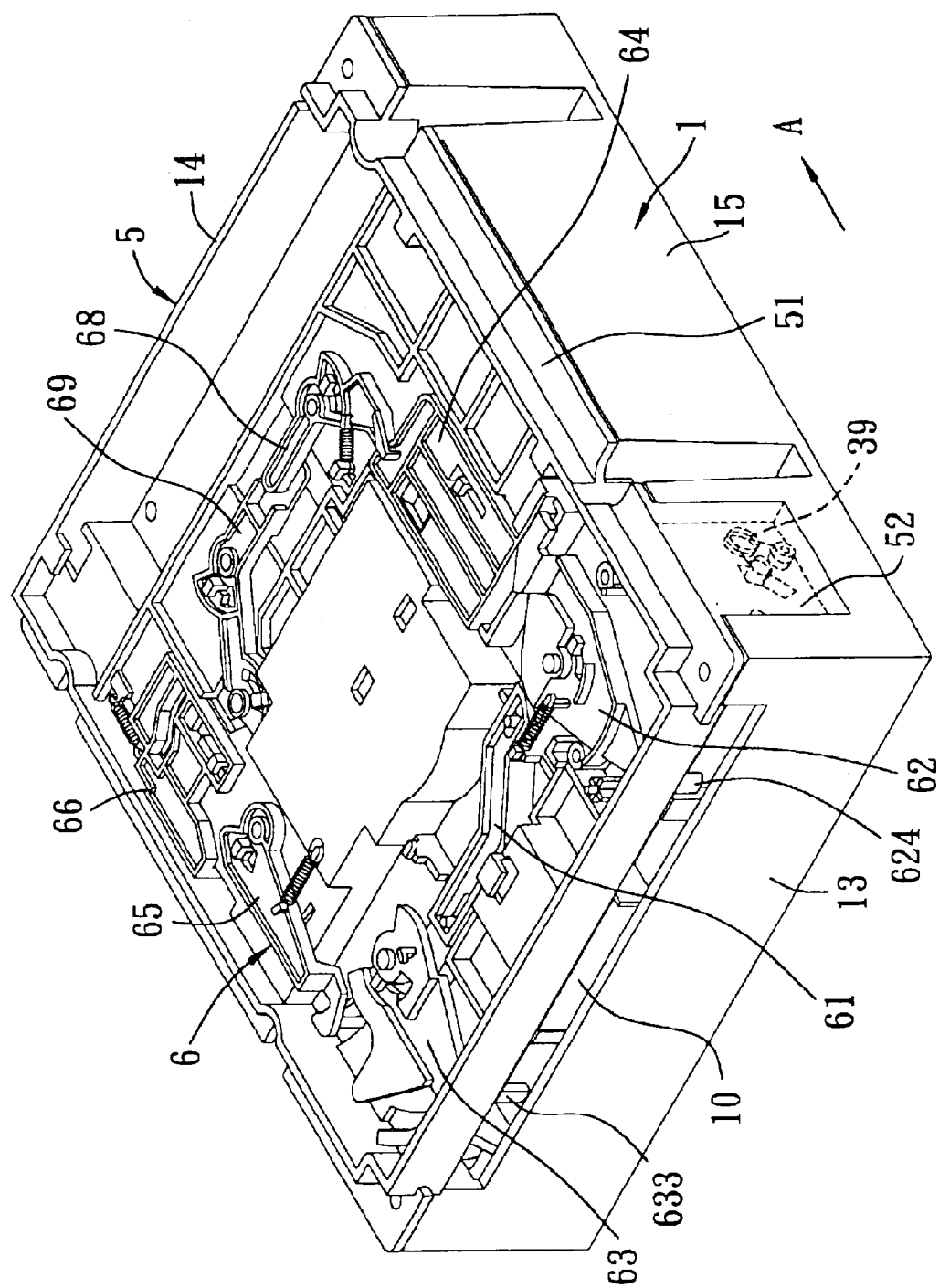
FIG. 1 is an assembled perspective view of the preferred embodiment of a slot-in type optical disk-loading apparatus according to this invention.
Figure 2:
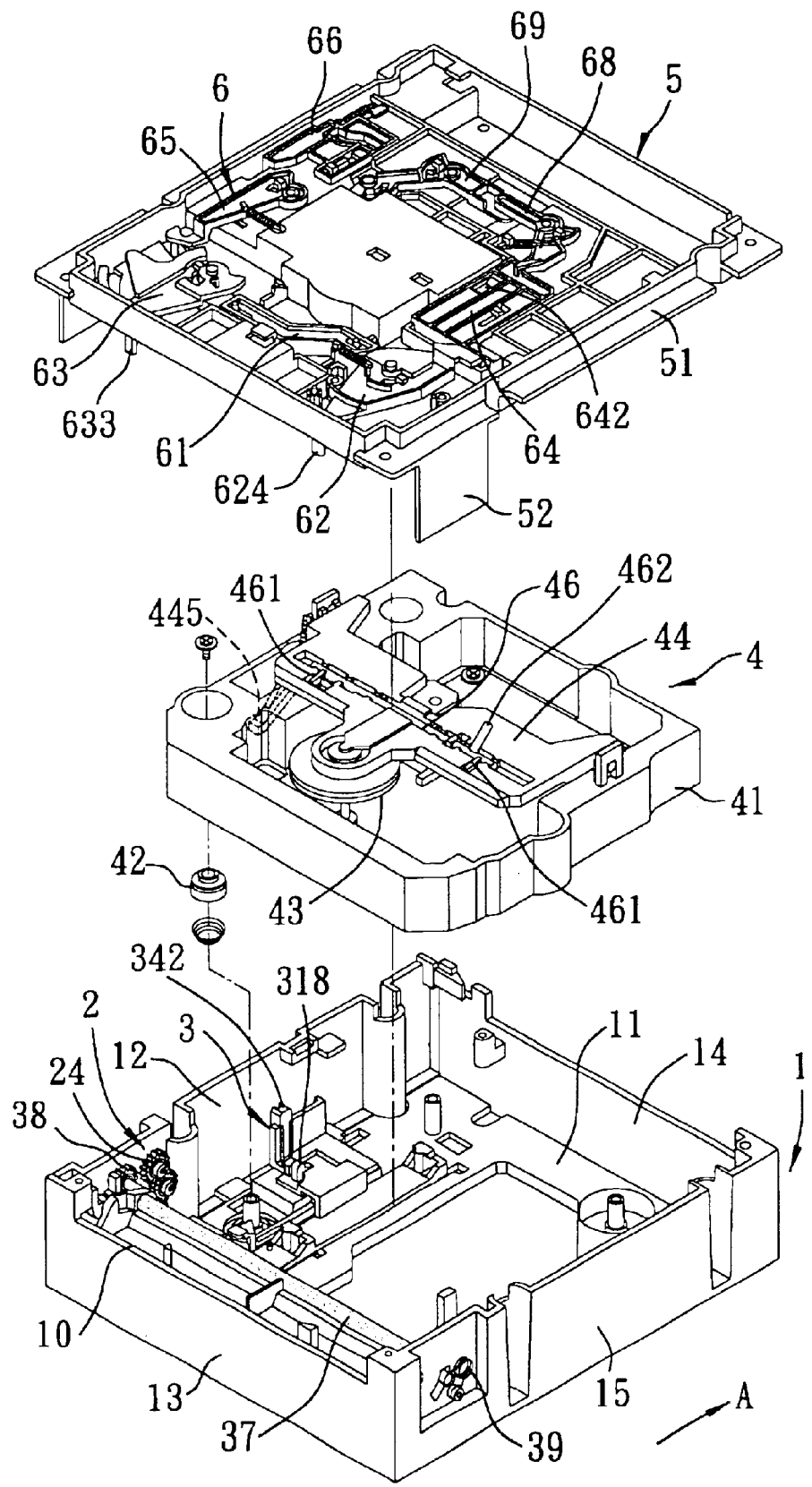
FIG. 2 is a partly exploded view of the preferred embodiment.
Figure 3:
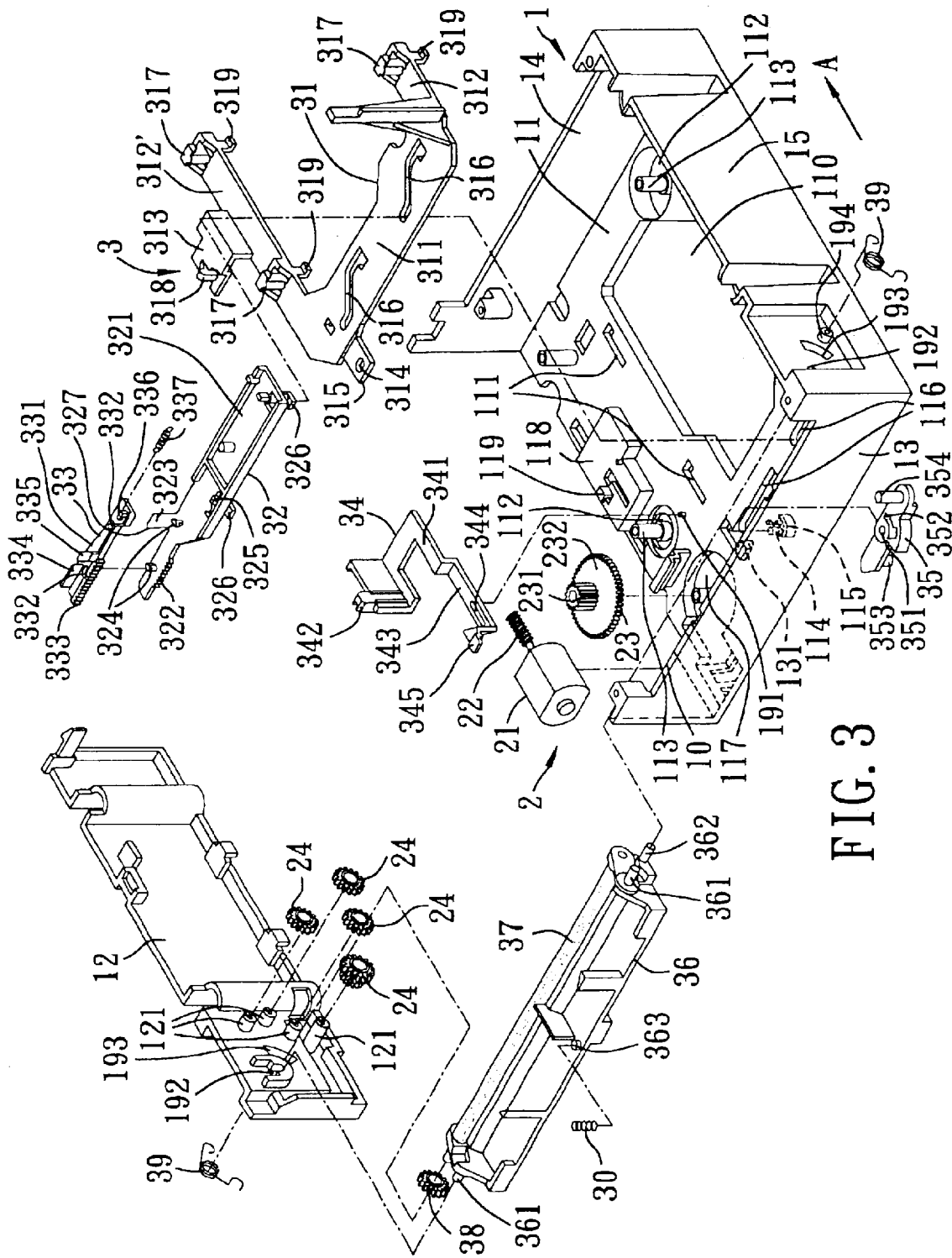
FIG. 3 is an exploded perspective view of a first housing, a power-supplying device, and a driving device of the preferred embodiment.

Referring to FIGS. 1 and 2, the preferred embodiment of a slot-in type optical disk-loading apparatus according to this invention is shown to include a first housing 1, a power-supplying device 2, a driving device 3, a disk-loading device 4, a second housing 5, and a disk-positioning device 6.

Note that, for the sake of convenience of description of the relative positions among the elements of the apparatus, arrows (A) are used in the relevant drawings to point toward the rear of the apparatus.

The apparatus of this invention can be used with a large diameter optical disk 91 (see FIGS. 11, 12, 13, 18, and 21), which has a diameter of 12 cm, or a small diameter optical disk 92 (see FIGS. 26, 27, 28, 29, and 30), which has a diameter of 8 cm.

Figure 26:
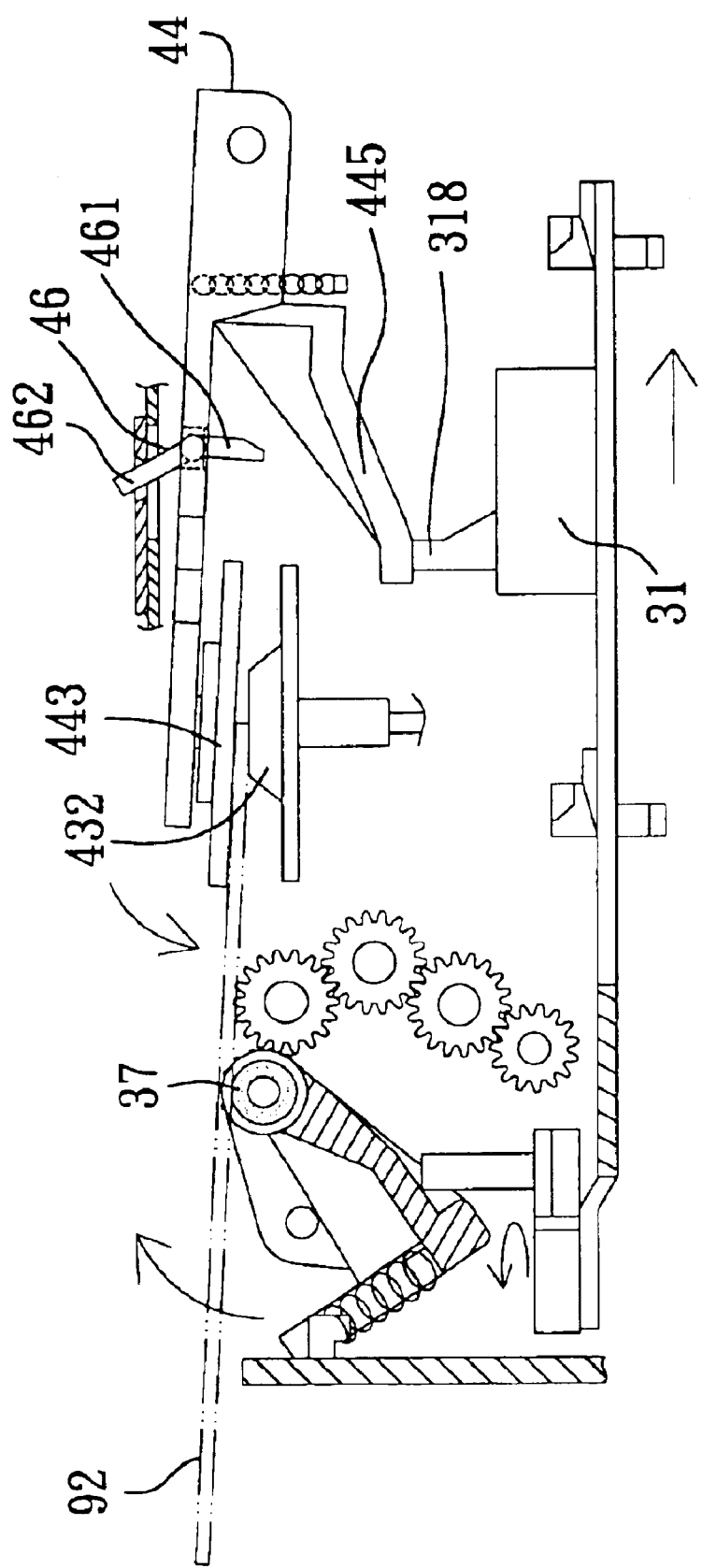
FIG. 26 is a fragmentary schematic sectional side view of the preferred embodiment, illustrating how a small diameter optical disk is inserted into the disk slot.

The first and second housings 1, 5 are interconnected fixedly to define a disk slot 10 for insertion of the large diameter optical disk 91 (see FIG. 11) or the small diameter optical disk 92 (see FIG. 26).

Referring to FIGS. 2, 3, 4, and 5, the first housing 1 has a bottom plate 11, a right side plate 12, a front side plate 13, a rear side plate 14, and a left side plate 15. The bottom plate 11 has a central opening 110, a plurality of L-shaped slide slots 111, a plurality of casing-supporting portions 112, a plurality of internally threaded posts 113 extending respectively, integrally, and upwardly from the casing-supporting portions 112, an insert post 114, an L-shaped front retainer 115 adjacent to the insert post 114, two transverse slots 116 disposed behind the insert post 114, a gear-mounting portion 117 adjacent to the transverse slots 116, an upward projection 118 disposed behind the gear-mounting portion 117, an L-shaped rear retainer 119 fixed on the upward projection 118, and an insert rod 191 disposed fixedly between the gear-mounting portion 117 and the upward projection 118. The front side plate 13 is formed with a fixed spring-retaining element 131 at an upper end. Each of the right and left side plates 12, 15 is formed with a hole 192 and a curved slot 193 that are adjacent to each other. Each of the left and right side plates 15, 12 has an outer side surface that is formed with a laterally extending rod 194. The right side plate 12 has an inner side surface that is formed with a plurality of gear-mounting rods 121 that are adjacent to the gear-mounting portion 117.

The power-supplying device 2 is disposed between the first and second housings 1, 5, and includes a motor 21 disposed on the bottom plate 11 and provided with a motor shaft 211, a worm 22 connected fixedly to the motor shaft 211, a gear unit 23 mounted rotatably on the gear-mounting portion 117 and having a small-diameter upper gear 231 and a large-diameter lower gear 232 that is connected fixedly to the upper gear 231 and that meshes with the worm 22, and a series of gears 241 sleeved respectively and rotatably on the gear-mounting rods 121. Each adjacent pair of the gears 241 mesh with each other. The lowermost gear 241 meshes with the worm 22.

The driving device 3 is disposed between the first and second housings 1, 5, and includes a longitudinally movable member 31 movable frontwardly and rearwardly on the first housing 1, a transversely movable member 32 movable leftwardly or rightwardly on the longitudinally movable member 31, a driving plate 33 disposed pivotally on the transversely movable member 32, a movable seat 34 driven to move the driving plate 33, a swingable member 35 disposed pivotally on the longitudinally movable member 31 and rotatable about a vertical axis, a swing seat 36 disposed pivotally on the first housing 1 and rotatable about a horizontal axis, a roller 37 journalled on the swing seat 36, a driven gear 38 sleeved fixedly on an end of the roller 37 and meshing with the uppermost gear 24, two first return springs 39 that are constructed as torsion springs, and a second return spring 30 that is constructed as a coiled compression spring. The first and second return springs 39, 30 are used to bias the swing seat 36 to turn to an upper limit position shown in FIG. 10.

The longitudinally movable member 31 includes a front plate 311, a pair of left and right plates 312, 312' extending respectively, integrally, and rearwardly from two opposite side portions of the front plate 311, an L-shaped right projecting plate 313 extending integrally from the right plate 312', a front projecting plate 315 extending integrally and frontwardly from a right side portion of the front plate 311 and having a pivot hole 314, two zigzag slots 316 formed through the front plate 311, a T-shaped retaining block 317 formed on a rear end of the right plate 312', a supporting block 318 extending integrally and downwardly from the L-shaped right projecting plate 313, and a plurality of L-shaped retainers 319 extending integrally and downwardly from the left and right plates 312, 312'. The retainers 319 are received respectively and slidably within the L-shaped slide slots 111 in the bottom plate 11 of the first housing 1. As such, the longitudinally movable member 31 can move frontwardly and rearwardly on the bottom plate 11.

The transversely movable member 32 includes a plate body 321, a rack 322 disposed fixedly on a bottom surface of a right end portion of the plate body 321, an inclined pushing block 323 extending integrally from a rear edge of the plate body 321 and adjacent to the rack 322, two positioning pins 324 extending integrally and upwardly from the plate body 321 and adjacent to the rack 322, a spring-retaining element 325 connected fixedly to a front edge of the plate body 321, and two L-shaped retainers 326 extending integrally and downwardly from the plate body 321. The inclined pushing block 323 has an inclined right side surface 327. The retainers 326 extend respectively through the zigzag slots 316, and are received respectively and slidably within the transverse slots 116. As such, the transversely movable member 32 can move leftwardly and rightwardly on the bottom plate 11. The rack 322 is spaced apart from the upper gear 231 of the gear unit 23.

The driving plate 33 includes a plate body 331 overlying the transversely movable member 32, two holes 332 formed through the plate body 331 for insertion of the positioning pins 324, a rack 333 formed on a front surface of the plate body 331, a longitudinal abutment wall 334 extending in a longitudinal direction of the plate body 331, a leftwardly and downwardly inclined abutment wall 335 having an end adjacent to the longitudinal abutment wall 334 and inclined with respect to the longitudinal direction of the plate body 331, a spring-retaining element 336 connected fixedly to a left end of the plate body 331, and a coiled tension spring 337 having two ends that are fastened respectively to the spring-retaining elements 336, 325. The rack 333 is spaced apart from and is located behind the upper gear 231 of the gear unit 23.

The movable seat 34 includes a push plate 341 disposed movably on the upward projection 118, a male insert plate 342 extending integrally and upwardly from the push plate 341, a generally U-shaped push rod 343 connected fixedly to and disposed in front of the push plate 341, a longitudinal slot 344 formed through the push rod 343 for insertion of the insert rod 191 therethrough so that the movable seat 34 can move frontwardly and rearwardly on the bottom plate 11, and a pushing head 345 formed on a front end of the push rod 343 and spaced apart from the longitudinal abutment wall 334.

The swingable member 35 includes a vertical hole 351 for insertion of the insert post 114, a curved slot 352 for insertion of the front retainer 115, an insert rod 353 extending through the pivot hole 314, and a support rod 354 extending integrally and upwardly from a left end of the swingable member 35.

The swing seat 36 includes two aligned horizontal pivot pins 361 extending respectively, integrally, and outwardly from left and right end surfaces thereof, two aligned horizontal slide rods 362 extending respectively, integrally, and outwardly from the left and right end surfaces thereof behind the pivot pins 361, a middle projection 363 extending into the curved slots 193, and an inclined slide slot 364 (see FIG. 10) formed in a bottom surface of the swing seat 36 for insertion of the support rod 354.

The roller 37 is journalled on an upper end portion of the swing seat 36. The driven gear 38 is connected fixedly to a right end of the roller 37. The first return springs 39 are disposed between the laterally extending rods 194 and the slide rods 362. The second return spring 30 has two ends that are fastened respectively to the spring-retaining element 131 and the middle projection 363.

Referring to FIGS. 2, 3, 6, and 7, the disk-loading device 4 is disposed between the first and second housings 1, 5, and includes a loading casing 41 disposed on the bottom plate 11, a plurality of shock-absorber units 42 disposed between the loading casing 41 and the bottom plate 11 for supporting the loading casing 41, a disk-supporting unit 43 fixed on the loading casing 41, a pressing unit 44 mounted pivotally on the loading casing 41 and spaced apart from and disposed above the disk-supporting unit 43, a spring 45 disposed between the pressing unit 44 and the loading casing 41 so as to bias the pressing unit 44 to press the large diameter optical disk 91 (see FIG. 11) or the small diameter optical disk 92 (see FIG. 26) against the disk-supporting unit 43, and a stop rod 46 disposed pivotally on the pressing unit 44. The loading casing 41 includes an accommodating chamber 411 communicated with the central opening 110 for receiving the disk-supporting unit 43, a hole 412 for insertion of the T-shaped retaining block 317, a plurality of engagement portions 413 engaging respectively the casing-supporting portions 112 and sleeved respectively on the internally threaded posts 113, two brackets 414 disposed respectively and fixedly on top surfaces of left and right walls of the loading casing 41, a spring-retaining element 415 connected fixedly to the right wall of the loading casing 41, and an opening 416 adjacent to the spring-retaining element 415. The hole 412 has a narrow portion (412N) (see FIG. 20) and a wide portion (412W) (see FIG. 19). The retaining block 317 is disposed at the narrow portion (412N) of the hole (412) so as to press the loading casing 41 against the bottom plate 11. As such, the loading casing 41 is locked on the bottom plate 11.

Each of the shock-absorber units 42 includes a coiled compression spring 421 sleeved on the corresponding internally threaded post 113 and disposed between the loading case 41 and the bottom plate 11, a cap 422 sleeved on the spring 421 and biased to press against the corresponding engagement portion 413, and a bolt 423 extending through the corresponding engagement portion 413 and engaging the corresponding internally threaded post 113 so as to retain the loading casing 41 on the bottom plate 11.

The disk-supporting unit 43 includes a horizontal plate 431 fixed on the loading casing 41, a disk-supporting member 432 disposed pivotally on the horizontal plate 431, and an optical reading unit 433 installed on the horizontal plate 431 in a known manner.

The pressing unit 44 includes a pressing plate 441 disposed above the disk-supporting unit 43, a pair of left and right pivot pins 442 formed respectively on left and right end surfaces of the pressing plate 441 and connected respectively and rotatably to the brackets 414, a pressing disk 443 connected fixedly to the pressing plate 441 and rotatable to press the large diameter optical disk 91 (see FIG. 11) or the small diameter optical disk 92 (see FIG. 26) against the disk-supporting member 432, a spring-retaining element 444 connected fixedly to a right end of the pressing plate 441 and located in front of the right pivot pin 442, an inclined abutment arm 445 extending integrally, frontwardly, and downwardly from the pressing plate 441, and a positioning slot 446 formed in the pressing plate 441 and having two parallel frontward extension portions 447. The inclined abutment arm 445 extends into the opening 416, and abuts against the supporting block 318 so that the pressing disk 443 is spaced apart from and is disposed above the disk-supporting member 432.

The spring 45 has two ends that are fastened respectively to the spring-retaining elements 444, 415 so as to bias the pressing disk 443 to press the large diameter optical disk 91 (see FIG. 11) or the small diameter optical disk 92 (see FIG. 26) against the disk-supporting member 432.

The stop rod 46 is journalled within the positioning slot 446, and is formed with two integral cylindrical rear limiting members 461 extending integrally, frontwardly, and downwardly from the stop rod 46 into a disk path (P) (see FIG. 21) and rotatable into the frontward extension portions 447 of the positioning slot 446, and an integral rearwardly and upwardly inclined rod 462.

Figure 8:
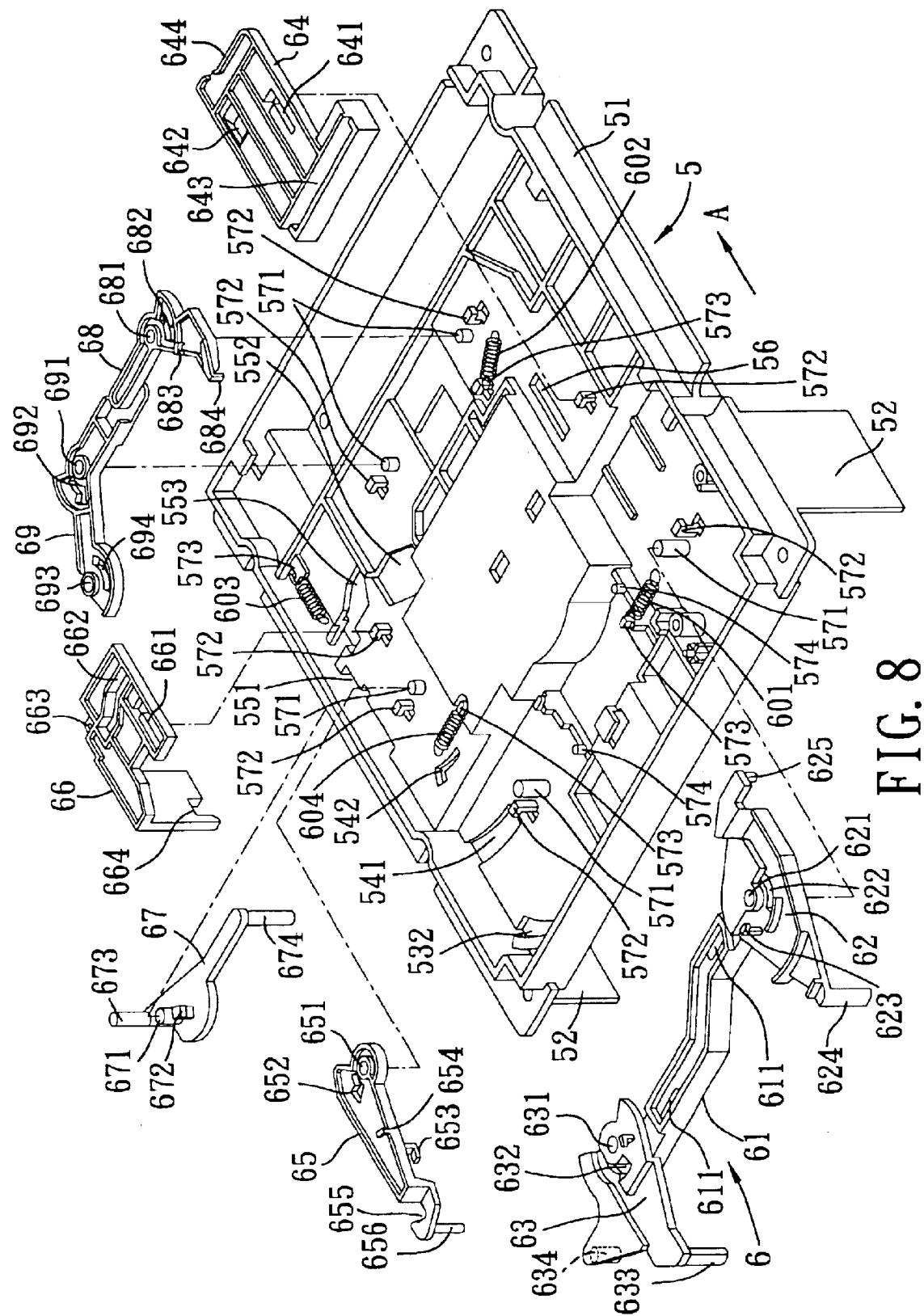
FIG. 8 is a partly exploded perspective view of a second housing and a disk-positioning device of the preferred embodiment.
Figure 9:
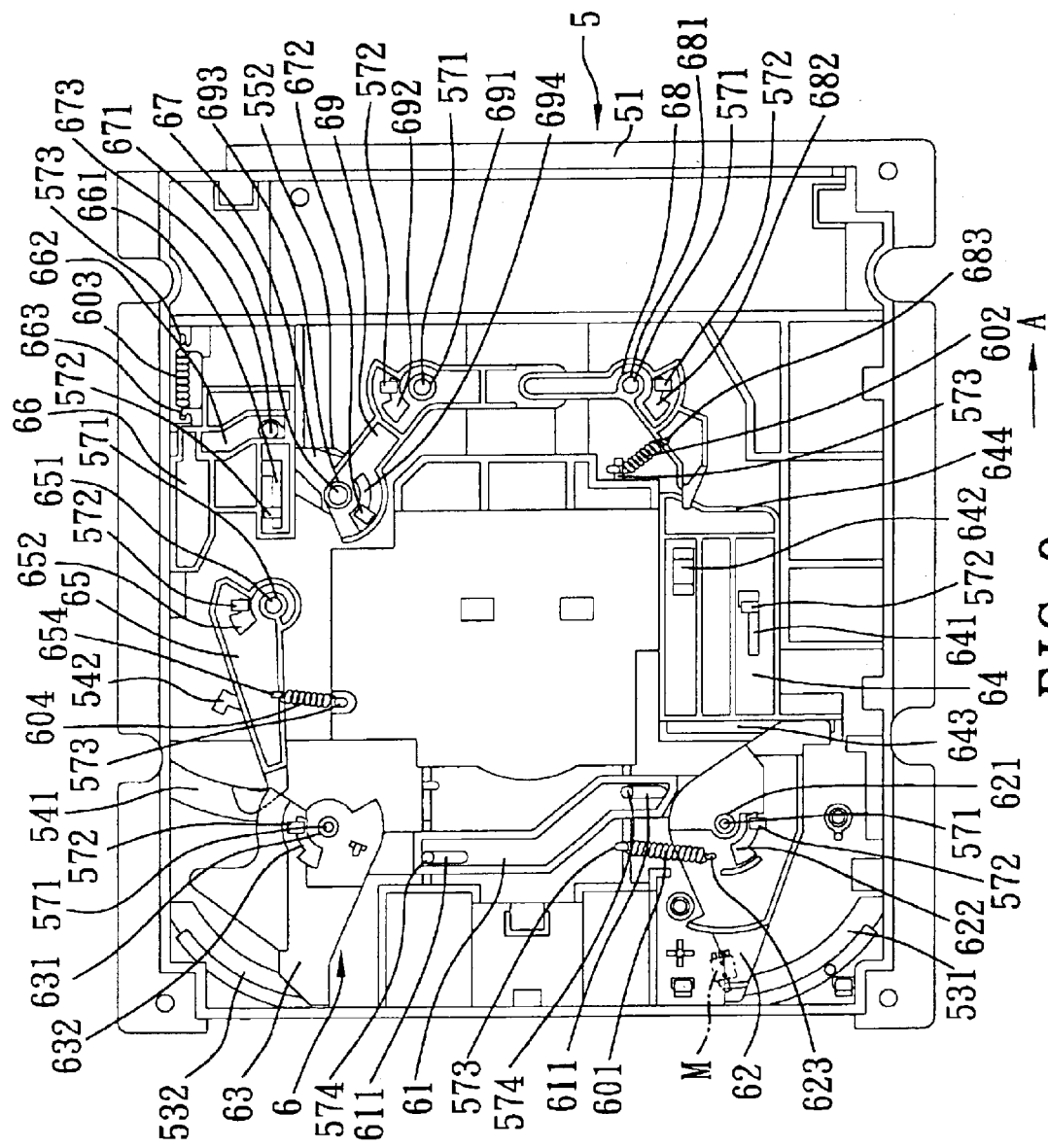
FIG. 9 is a top view of the second housing and the disk-positioning device of the preferred embodiment.

Referring to FIGS. 2, 8, and 9, the second housing 5 includes a top plate 51 connected threadedly to the left, right, and rear side plates 15, 12, 14, two shielding plates 52 extending respectively, integrally, and downwardly from front ends of left and right sides of the top plate 51, a pair of curved left and right slide slots 531, 532 formed in a front end of the top plate 51, a rear slide slot 541 disposed behind the right slide slot 532, a positioning slot 542 disposed behind the rear slide slot 541, a guide slot 551 disposed behind the positioning slot 542, a pair of inner and outer slots 552, 553 disposed behind the guide slot 551, a straight slot 56 disposed behind the left slide slot 531, a plurality of adjacent pairs of upright pivot pins 571, a plurality of L-shaped retainers 572, a plurality of spring-retaining elements 573, and a plurality of insert posts 574. The L-shaped retainers 572, the spring-retaining elements 573, and the insert posts 574 are fixed on the top plate 51. The shielding plates 52 are used to cover the first return springs 39, as shown in FIG. 1.

The disk-positioning device 6 includes a bent transverse rod 61, a pair of left and right positioning plates 62, 63 connected respectively and pivotally to two ends of the bent transverse rod 61, a left slide plate 64 connected to and disposed behind the left positioning plate 62, a hook plate 65 disposed behind the right positioning plate 63, a right slide plate 66 disposed behind the hook plate 65, a rotating plate 67 connected to the right slide plate 66, a left link 68 connected to the left slide plate 64, and a right link 69 interconnecting the left link 68 and the rotating plate 67. Four springs 601, 602, 603, 604 are used to restore the elements 61, 62, 63, 64, 65, 66, 67, 68, 69 to their original positions after the elements 61, 62, 63, 64, 65, 66, 67, 68, 69 are moved.

The bent transverse rod 61 has two end portions that are formed respectively with two slide slots 611 for insertion of the insert posts 574, respectively.

The left positioning plate 62 includes a hole 621 for insertion of the corresponding pivot pin 571, a curved slot 622 for insertion of the corresponding L-shaped retainer 572, a spring-retaining element 623 connected fixedly to the left positioning plate 62, a cylindrical left front limiting member 624 extending integrally and downwardly from a front end of the left positioning plate 62 and received slidably within the left slide slot 531, and a slide rod 625 extending integrally and downwardly from a rear end of the left positioning plate 62. As such, the left positioning plate 62 can rotate on the second housing 5.

The right positioning plate 63 includes a hole 61 for insertion of the corresponding pivot pin 571, a curved slide slot 632 for insertion of the corresponding L-shaped retainer 572, a cylindrical right front limiting member 633 extending integrally and downwardly from a front end of the right positioning plate 63 and received slidably within the right slide slot 532, and a retaining rod 634 extending integrally and downwardly from a right side of the right positioning plate 63. As such, the right positioning plate 63 can rotate on the second housing 5.

The left slide plate 64 includes a longitudinal slide slot 641 formed at a left rear portion of the left slide plate 64 for insertion of the corresponding L-shaped retainer 572, a rear slot 642 formed at a right rear portion of the left slide plate 64, a transverse slide slot 643 formed at a front end of the left slide plate 64 for insertion of the slide rod 625, and a transverse rib 644 extending integrally and upwardly from a rear end of the left slide slot 64. The inclined rod 462 extends through the straight slot 56 and into the rear slot 642. As such, when the left slide plate 64 moves rearwardly relative to the bottom plate 11, the inclined rod 642 turns rearwardly relative to the pressing plate 441 so as to turn the rear limiting members 461 frontwardly relative to the pressing plate 441.

The hook plate 65 includes a hole 651 for insertion of the corresponding pivot pin 571, a curved slide slot 652 for insertion of the corresponding L-shaped retainer 572, an L-shaped guide hook 653 extending integrally from a bottom surface of the hook plate 65 and inserted into the positioning slot 542, a spring-retaining element 654 extending integrally from a top surface of the hook plate 65, and a front end hook portion 655, and a driven rod 656 extending integrally and downwardly from the front end hook portion 655 and inserted into the rear slide slot 541. As such, the hook plate 65 can rotate on the second housing 5.

The right slide plate 66 includes a longitudinal slot 661, a zigzag slot 662 disposed behind the longitudinal slot 661, a spring-retaining element 663 connected fixedly to the right slide plate 66, and a female insert plate 664 extending integrally and downwardly from a right side of the right slide plate 66 and into the guide slot 551 so as to engage the male insert plate 342. As such, the right slide plate 66 can move frontwardly and rearwardly on the second housing 5.

The rotating plate 67 is disposed under the top plate 51, and includes a pivot pin 671 extending through the inner slot 552, a hook rod 672 extending through the inner slot 552, a guiding post 673 extending through the outer slot 553 and into the zigzag slot 662, and a cylindrical positioning member 674 extending integrally and downwardly from a left end of the rotating plate 67.

The left and right links 68, 69 are connected pivotally to each other. Each of the left and right links 68, 69 includes a hole 681, 691 for insertion of the corresponding pivot pin 571, and a curved slot 682, 692 for insertion of the corresponding L-shaped retainer 572. The left link 68 further includes a spring-retaining element 683 and a hook plate 684 that is retained on the rib 644. The right link 69 is formed with an end hole 693 for insertion of the pivot pin 671, and a curved slot 694 for insertion of the hook rod 672.

The spring 601 has two ends that are fastened respectively to the spring-retaining element 623 and the corresponding spring-retaining element 573. The spring 602 has two ends that are fastened respectively to the spring-retaining element 683 and the corresponding spring-retaining element 573. The spring 603 has two ends that are fastened respectively to the spring-retaining element 663 and the corresponding spring-retaining element 573. The spring 604 has two ends that are fastened respectively to the spring-retaining element 654 and the corresponding spring-retaining element 573.

Figure 5:
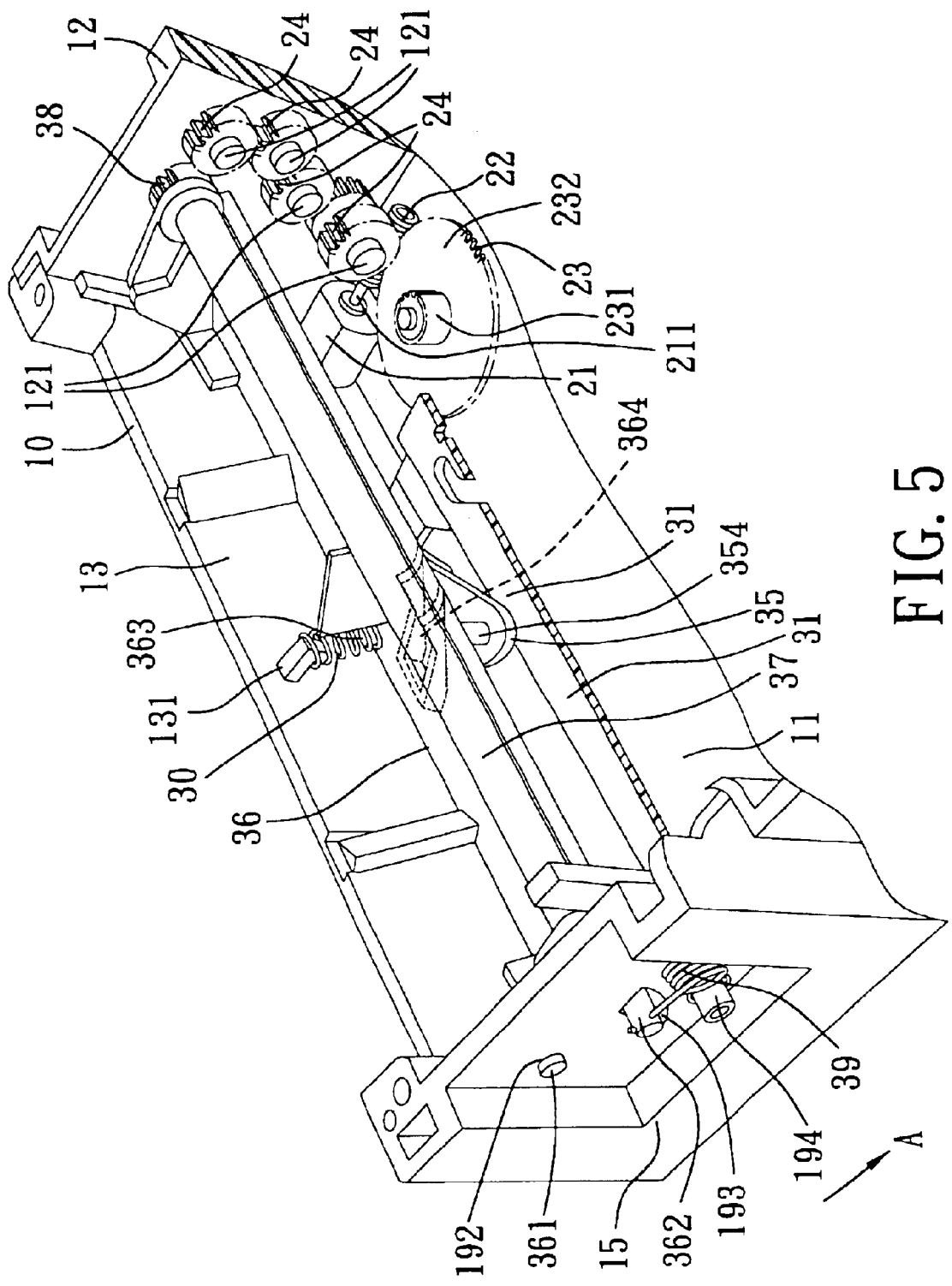
FIG. 5 is a fragmentary perspective view of the preferred embodiment, illustrating some connections among the first housing, the power-supplying device, and the driving device.
Figure 6:
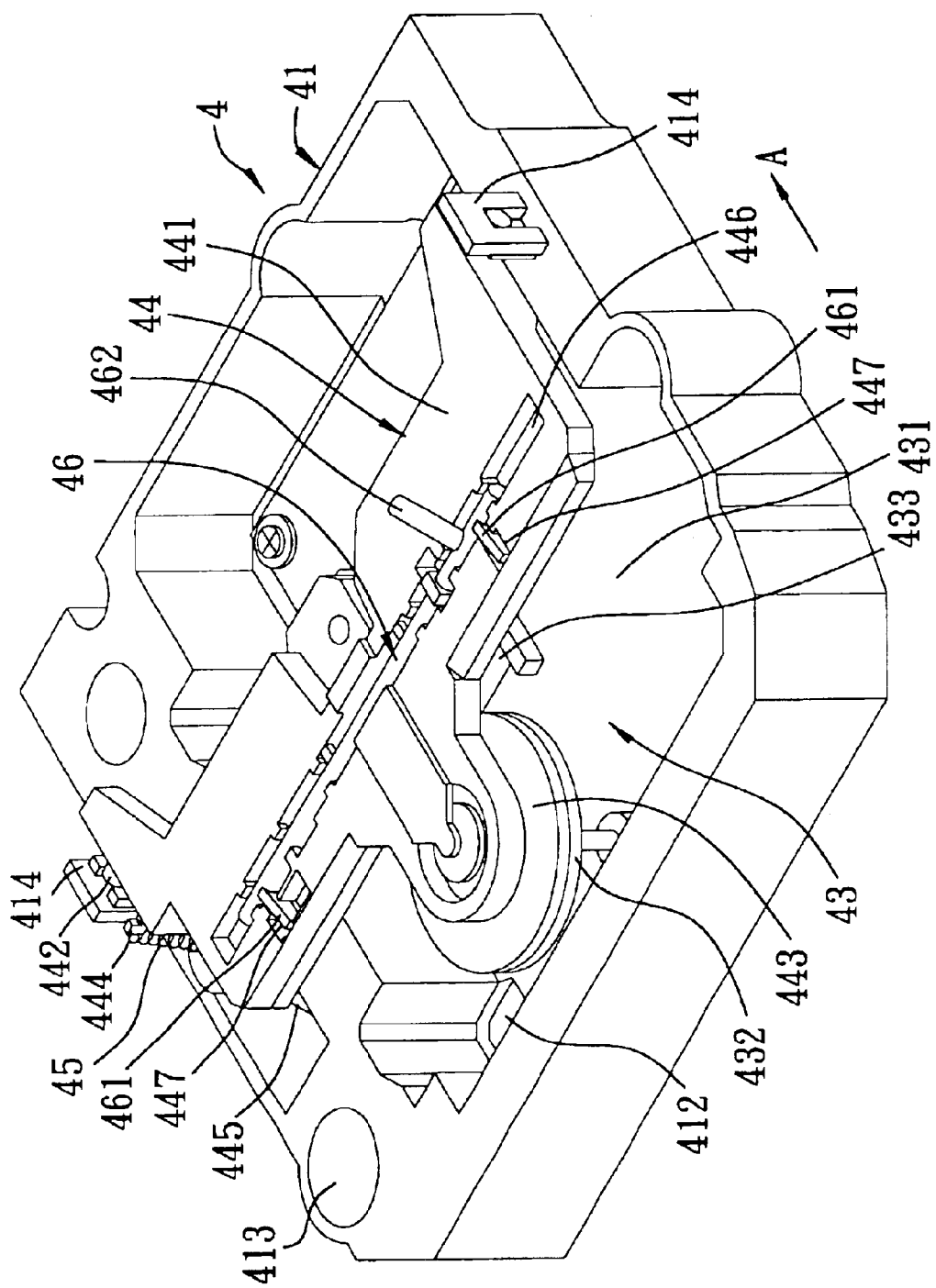
FIG. 6 is an assembled perspective view of a disk-loading device of the preferred embodiment.
Figure 10:
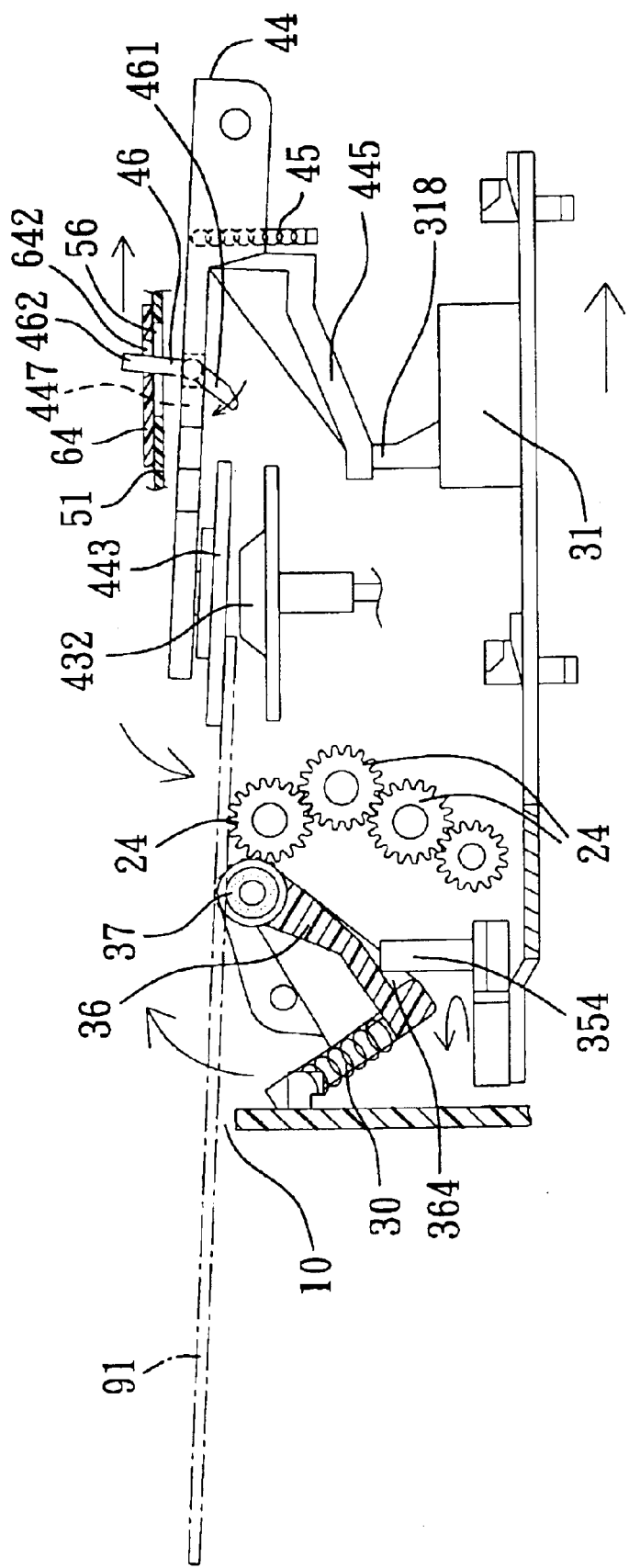
FIG. 10 is a fragmentary schematic sectional side view of the preferred embodiment, illustrating how a large diameter optical disk is inserted into a disk slot in the apparatus.
Figure 11:
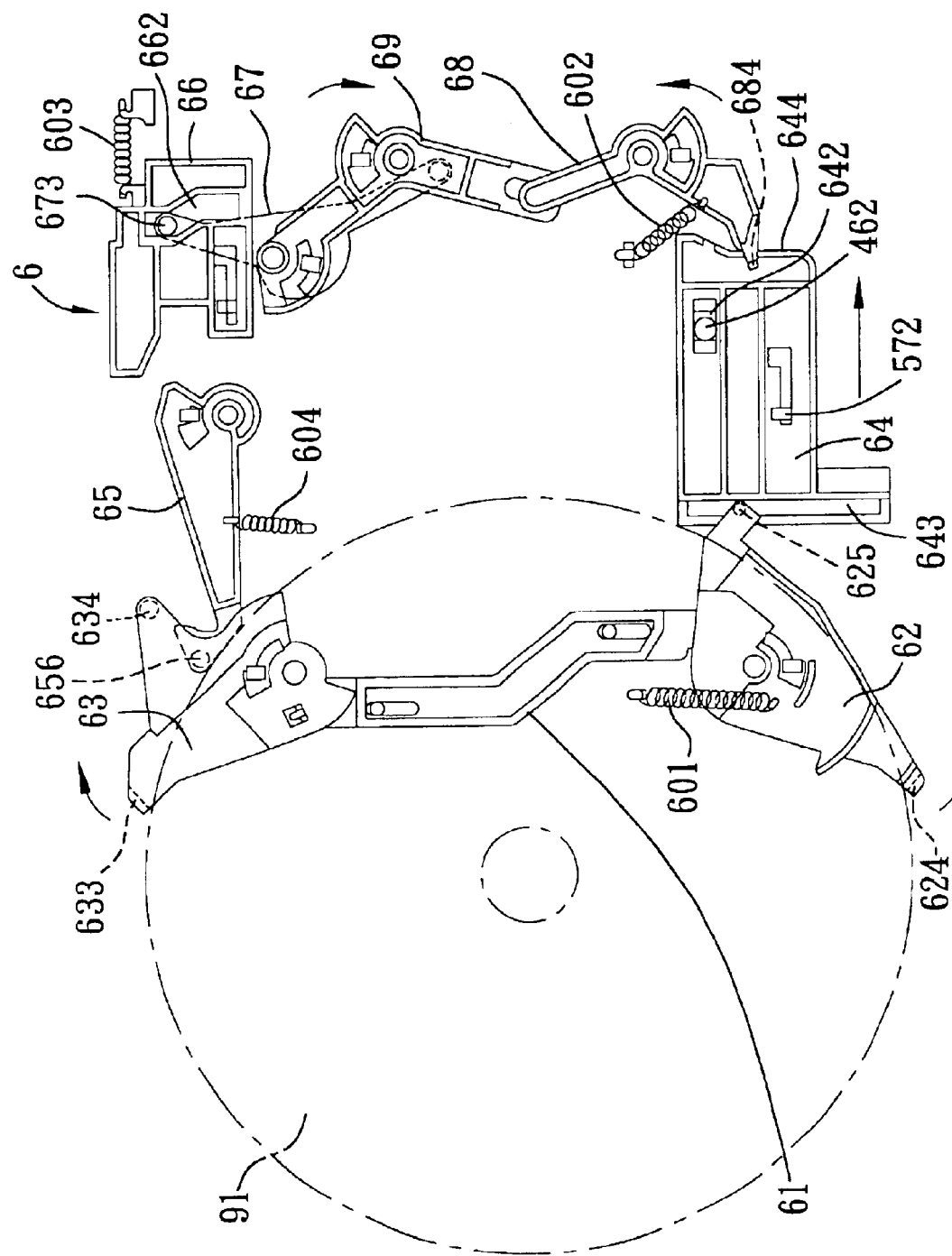
FIG. 11 is a fragmentary schematic top view of the preferred embodiment, illustrating how the large diameter optical disk is moved into the disk-positioning device.
Figure 12:
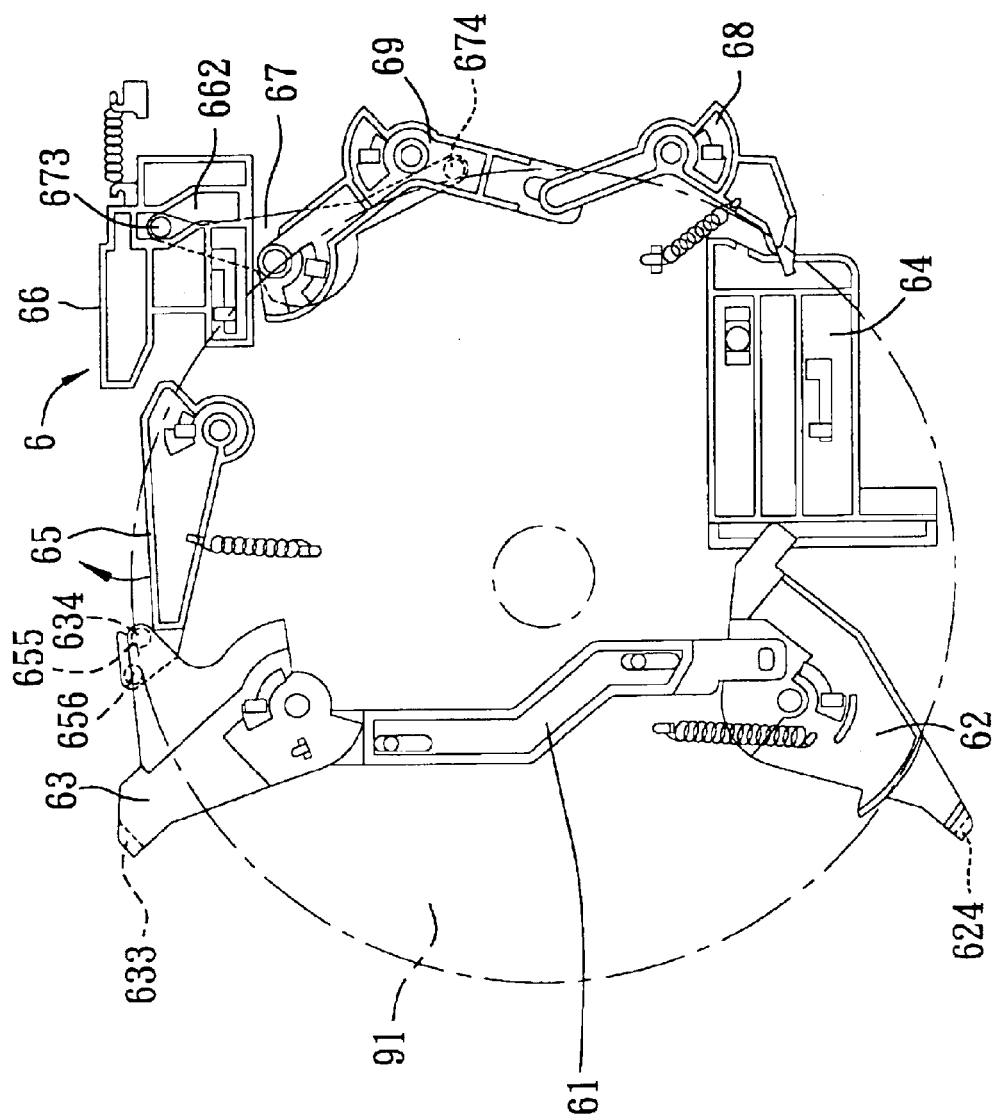
FIG. 12 is a fragmentary schematic top view of the preferred embodiment, illustrating how the large diameter optical disk is positioned within the disk-positioning device.

Referring to FIGS. 5, 10, and 11, when the large diameter optical disk 91 is inserted into the disk slot 10, it comes into frictional contact with the roller 37, and pushes the left and right front limiting members 624, 633 to turn outwardly from inner positions shown in FIG. 11, where the left and right front limiting members 624, 633 are spaced apart from each other by a smaller distance that is slightly smaller than the diameter of the small diameter optical disk 92 (see FIG. 27), to outer positions shown in FIG. 12, where the left and right front limiting members 624, 633 are spaced apart from each other by a larger distance that is slightly larger than the diameter of the large diameter optical disk 91 (see FIG. 12), against the biasing action of the spring 601 so as to contact and activate a motor-activating device that is configured as a contact switch (M) (see FIG. 9). As such, the motor 21 is driven by the contact switch (M) to rotate the motor shaft 211 in a first direction so as to rotate the roller 37 in a loading direction (i.e. clockwise direction in FIG. 10), thereby moving the large diameter optical disk 91 rearwardly due to frictional contact between the large diameter optical disk 91 and the roller 37. Because the left and right front limiting members 624, 633 are disposed at the outer positions where the left and right front limiting members 624, 633 are spaced apart from each other by the larger distance, which is slightly larger than the diameter of the large diameter optical disk 91, the large diameter optical disk 91 can move rearwardly through a space defined between the left and right front limiting members 624, 633. When the left front limiting member 624 and the left positioning plate 62 turns outwardly, the slide rod 625 moves along the transverse slide slot 643 so as to move the left slide plate 64 rearwardly, thereby turning the inclined rod 462 rearwardly. As such, the rear limiting members 461 turn forwardly away from the disk path (P) (see FIG. 21) into the frontward extension portions 447 of the positioning slot 446 so as to permit the large diameter optical disk 91 to move completely into the disk slot 10. Note that because the rear limiting members 461 are spaced apart from each other by a distance smaller than the diameter of the large diameter optical disk 91, if they are disposed at inclined positions as shown in FIG. 10, the large diameter optical disk 91 will be prevented from moving completely into the disk slot 10. When the left slide plate 64 moves rearwardly, the hook plate 684 moves along the rib 644 so as to turn the left and right links 68, 69 against the biasing action of the spring 602, as shown in FIG. 11, thereby moving the positioning member 674 rearwardly.

Referring to FIGS. 8 and 12, before the large diameter optical disk 91 moves completely into the disk slot 10 (see FIG. 10), it contacts and turns the driven rod 656 outwardly against the biasing action of the spring 604 so that the front end hook portion 655 engages the retaining rod 634, thereby fixing the hook plate 65 and the right positioning plate 63 on the second housing 5. As such, all the elements of the disk-positioning device 6 are fixed on the second housing 5, as shown in FIG. 12.

Figure 13:
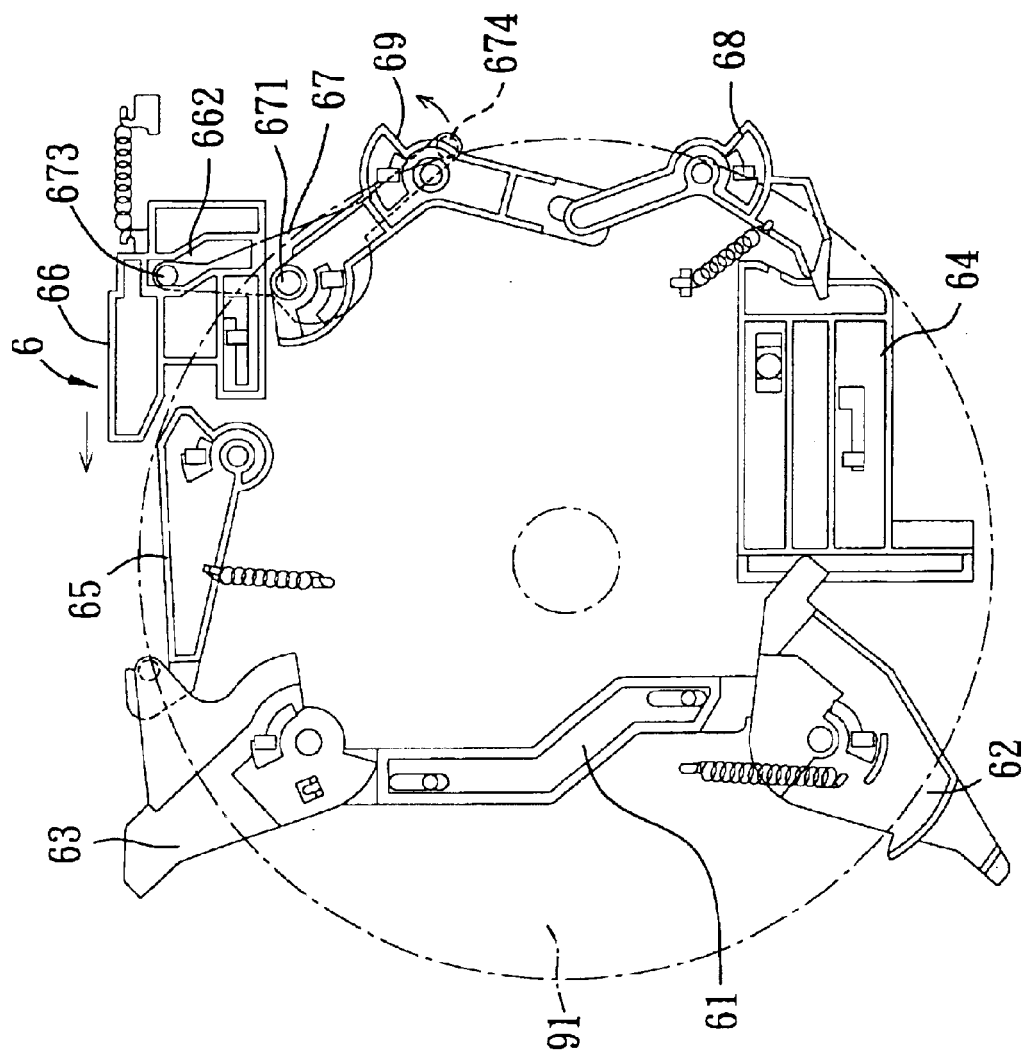
FIG. 13 is a fragmentary schematic top view of the preferred embodiment, illustrating how a sliding plate is moved frontwardly.

Referring to FIGS. 8 and 13, when the large diameter optical disk 91 moves to an engagement position shown in FIG. 12, it contacts and pushes the positioning member 674 to a limiting position shown in FIG. 13. As such, the rotating plate 67 rotates counterclockwise about the pivot pin 671 so that the guiding post 673 moves along the zigzag slot 662, thereby moving the right slide plate 66 frontwardly against the biasing action of the spring 603.

Figure 4:
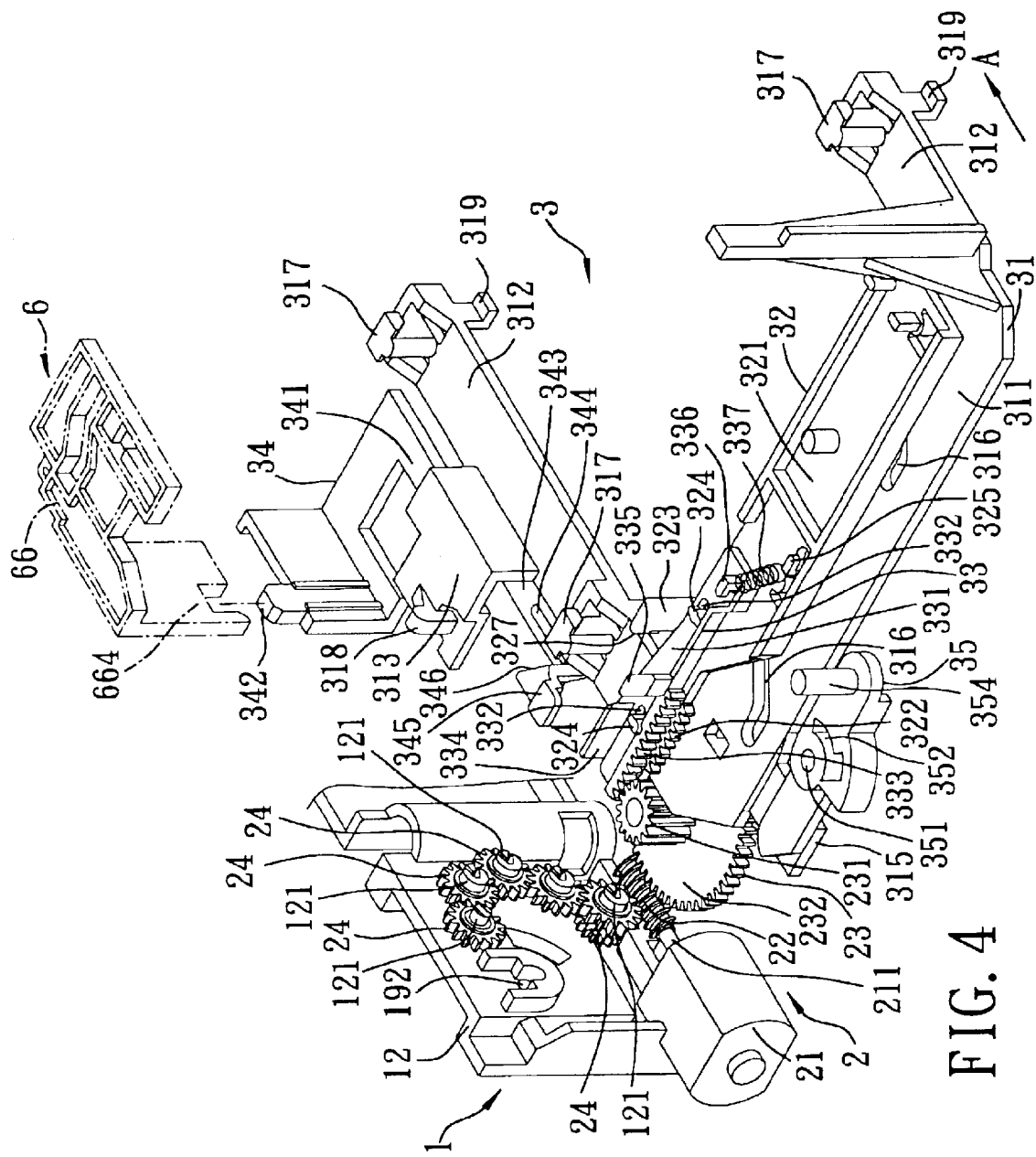
FIG. 4 is a partly exploded perspective view of the first housing, the power-supplying device, and the driving device of the preferred embodiment.
Figure 14:
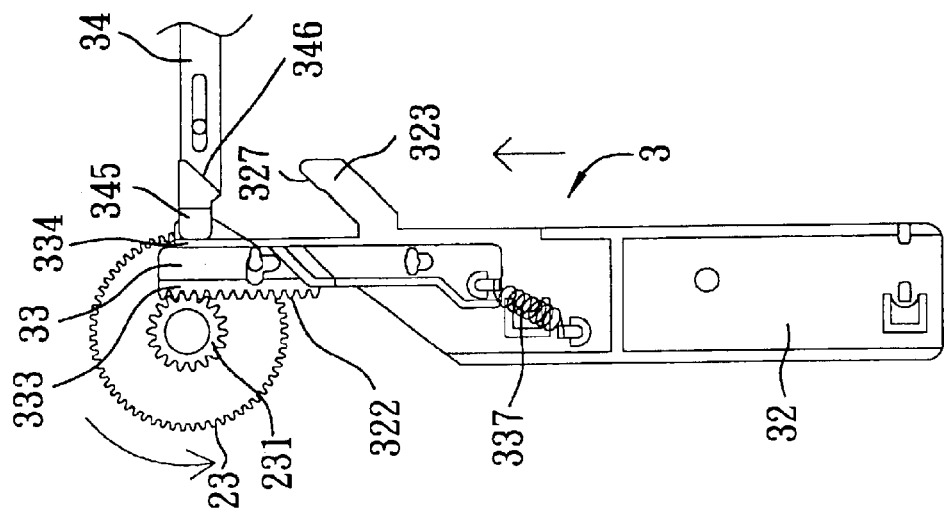
FIGS. 14 to 17 illustrate the operation of the power-supplying device and the driving device of the preferred embodiment when the large diameter optical disk is loaded.
Figure 15:
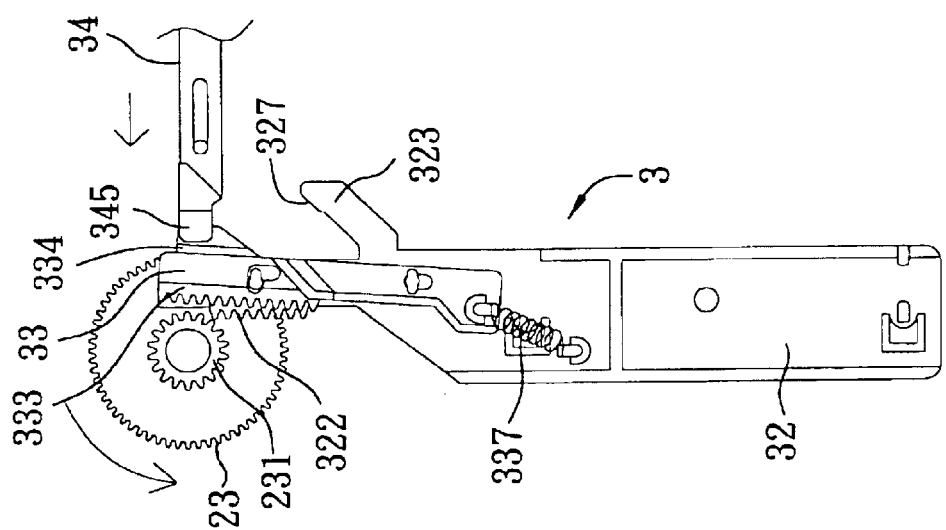

Referring to FIGS. 4, 8, and 14, the movable seat 34 moves synchronously with the right slide plate 66 due to engagement between the male insert plate 342 and the female insert plate 664 until the pushing head 345 contacts the longitudinal abutment wall 334. When the large diameter optical disk 91 (see FIG. 13) moves to a rear limit position shown in FIG. 13, where the positioning member 674 is disposed at the limiting position, the pushing head 345 contacts and pushes the longitudinal abutment wall 334 frontwardly so as to permit engagement of the rack 333 with the upper gear 231 of the gear unit 23, as shown in FIG. 15. Subsequently, counterclockwise rotation of the large gear 231 causes the driving plate 33 and the transversely movable member 32 to move rightwardly so as to permit engagement of the rack 322 with the upper gear 231.

Figure 17:
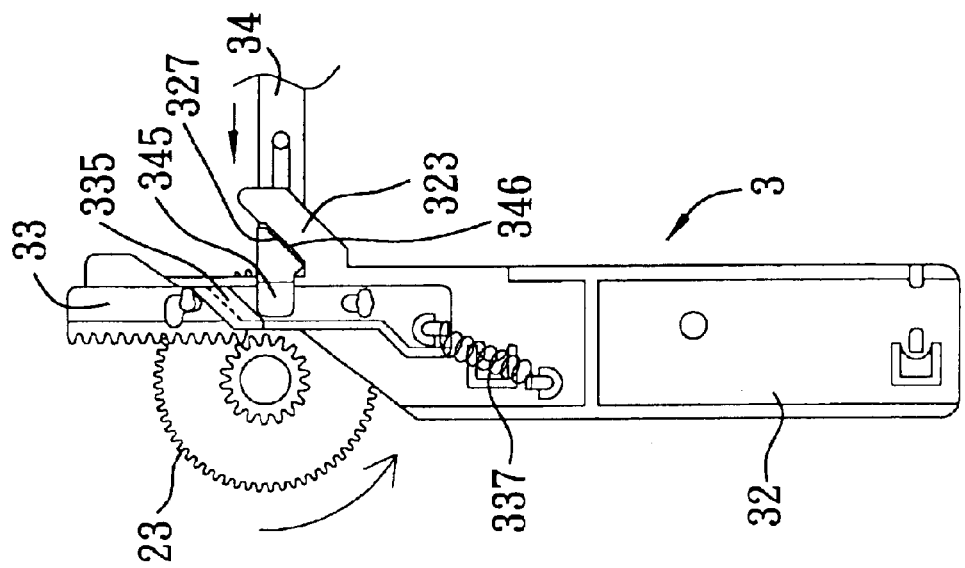
Figure 16:
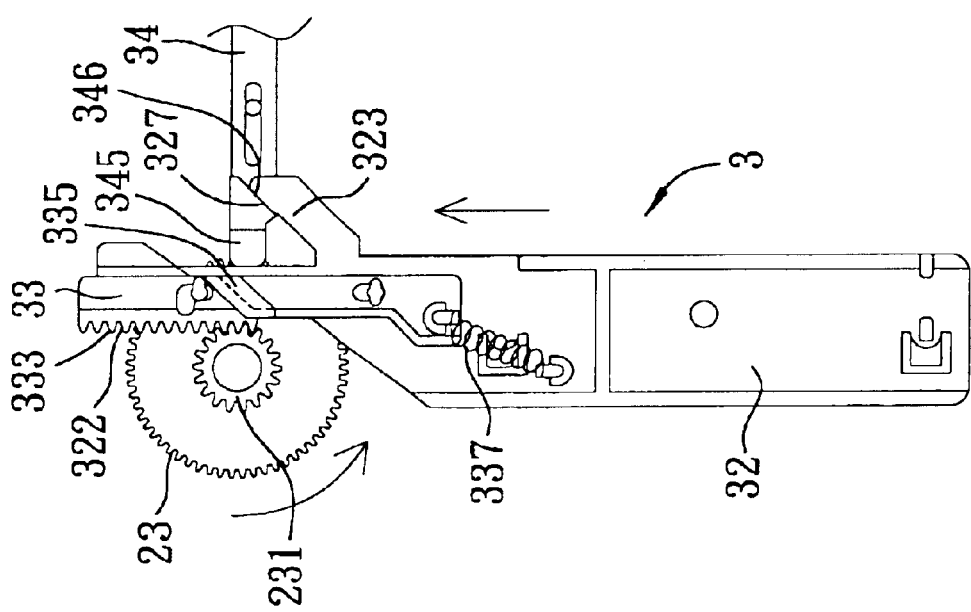
Figure 18:
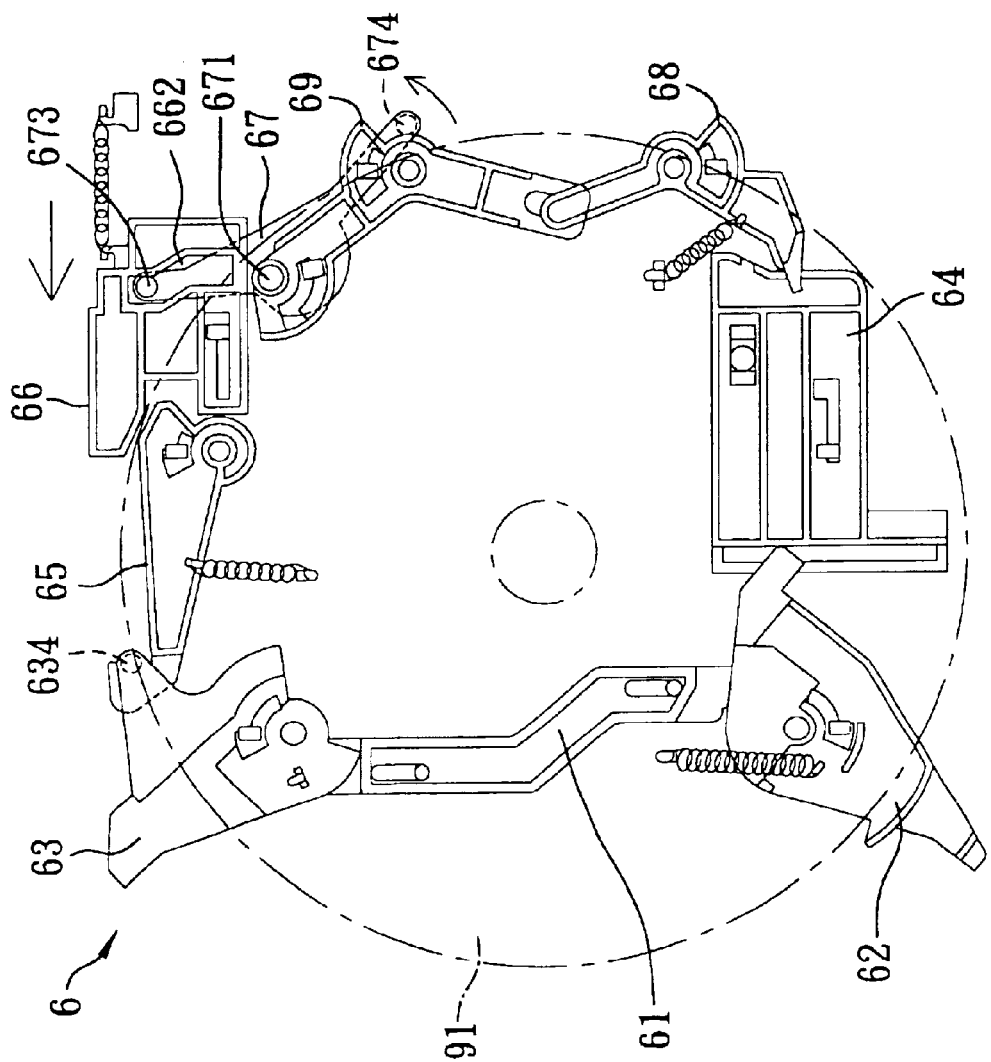
FIG. 18 is a fragmentary schematic top view of the preferred embodiment, illustrating how a positioning member is removed from the large diameter optical disk.

Referring to FIGS. 16, 17, and 18, when the transversely movable member 32 moves rightwardly, the inclined right side surface 327 of the pushing block 323 pushes an inclined rear side surface 346 of the pushing head 345 frontwardly so as to move the pushing head 345 on the inclined abutment wall 335, thereby moving the right slide plate 66 frontwardly once again. As such, the guiding post 673 moves along the zigzag slot 662 so that the the rotating plate 67 rotates counterclockwise about the pivot pin 671, thereby removing the positioning member 674 away from the large diameter optical disk 91, as shown in FIG. 18.

Figure 19:
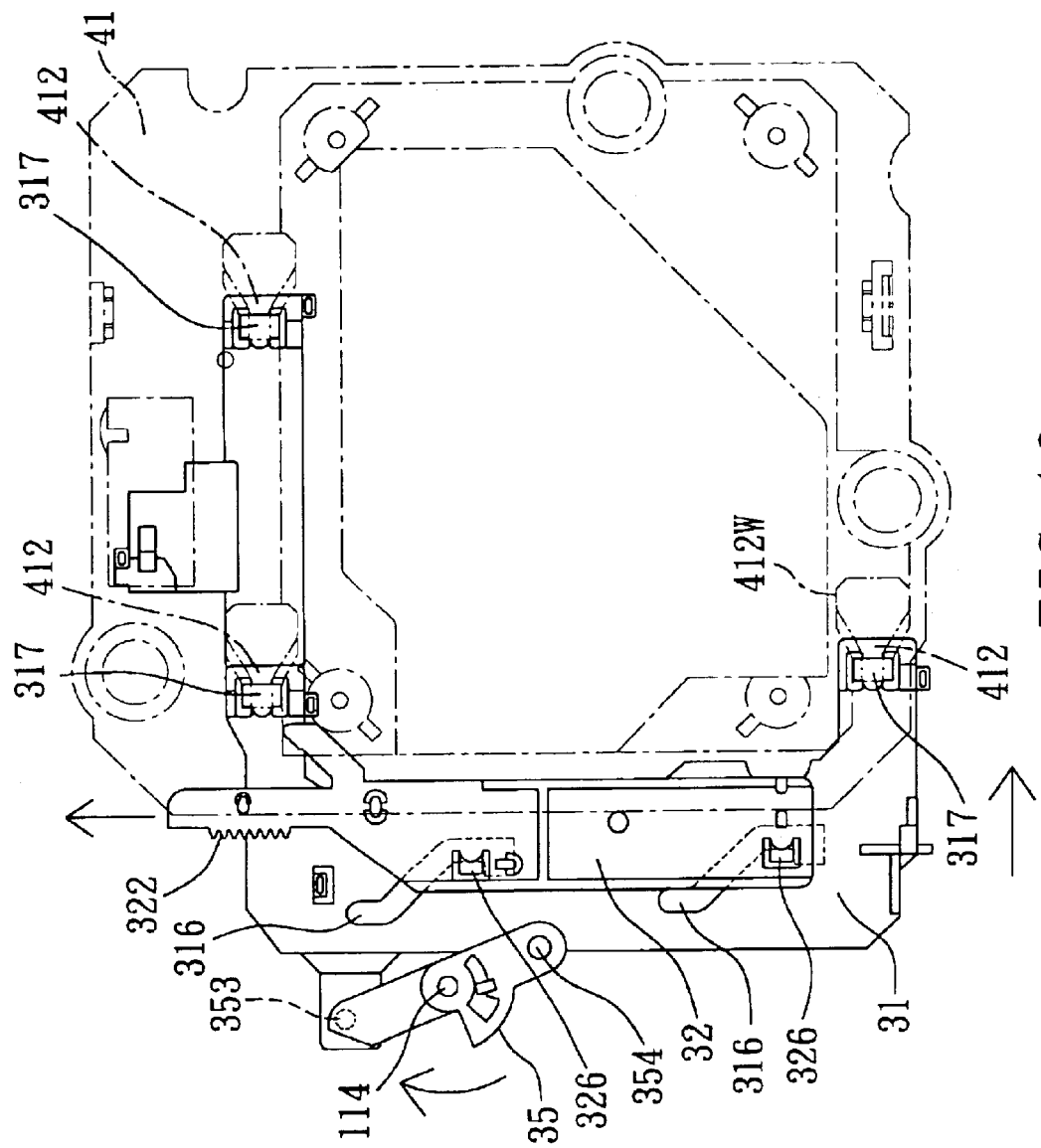
FIGS. 19 and 20 are fragmentary schematic top views of the preferred embodiment, illustrating how a longitudinally movable member is driven by a transversely movable member to move along a longitudinal direction of a loading casing.
Figure 20:
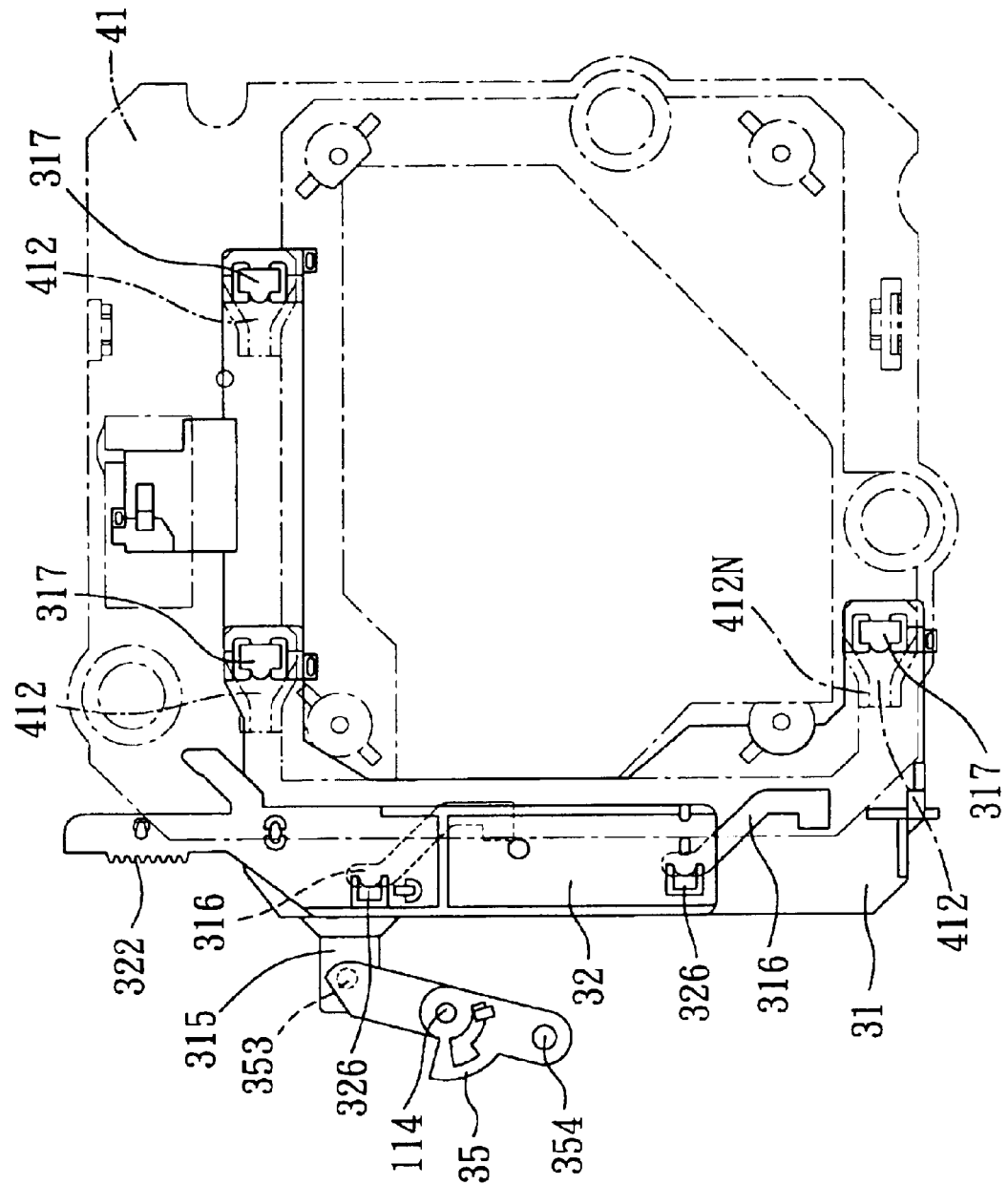
Figure 21:
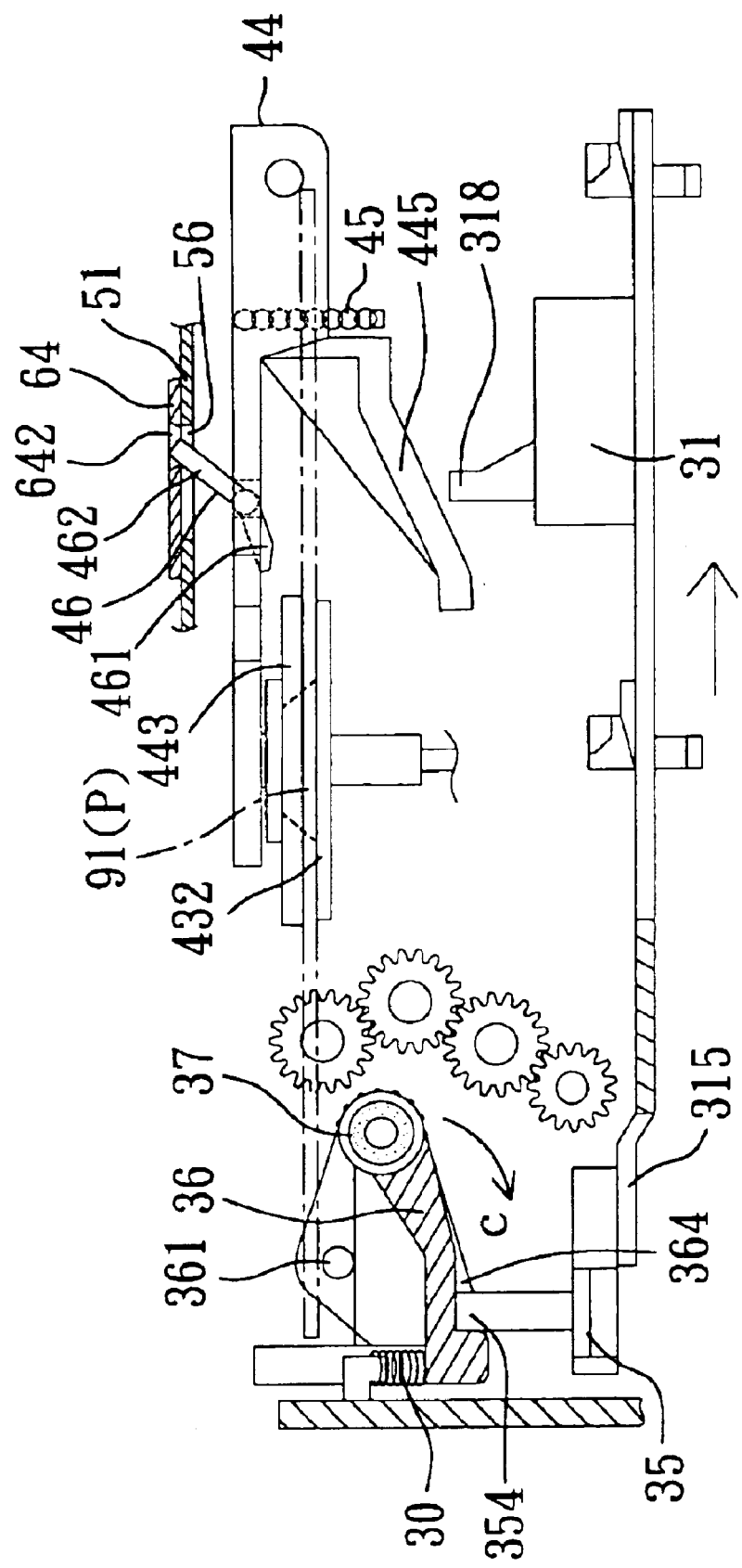
FIG. 21 is a fragmentary schematic sectional side view of the preferred embodiment, illustrating how the large diameter optical disk is pressed against a disk-supporting member by a pressing disk.

Referring to FIGS. 4, 19, and 20, when the transversely movable member 32 is driven by the gear unit 23 to move rightwardly, the L-shaped retainers 326 move along the zigzag slots 316 so as to move the longitudinally movable member 31 rearwardly from the position shown in FIG. 19 to that shown in FIG. 20. The rearward movement of the longitudinally movable member 31 results in the following actions:

(1) Referring to FIGS. 20 and 21, the swingable member 35 turns rearwardly about the insert hole 114 due to engagement between the insert rod 353 and the pivot hole 314. As such, the support rod 354 turns frontwardly to move into the inclined slide slot 364 so as to rotate the swing seat 36 about the pivot pins 361 in a direction (C) against the biasing action of the second return spring 30 to a lower limit position shown in FIG. 21, thereby turning the roller 37 downwardly to be separated from the large diameter optical disk 91, as shown in FIG. 21.

(2) Referring to FIG. 21, when the longitudinally movable member 31 moves rearwardly, the supporting block 318 separates from the inclined abutment arm 445. As such, the pressing unit 44 is pulled downwardly by the spring 45 to press the large-diameter optical disk 91 against the disk-supporting member 432 so that the large diameter optical disk 91 is sleeved around the disk-supporting member 432. When the optical disk 91 rotates in the apparatus for information reading, because the positioning member 674 is spaced apart from the large diameter optical disk 91, as shown in FIG. 18, friction between the large diameter optical disk 91 and the positioning member 674 can be prevented.

Figure 7:
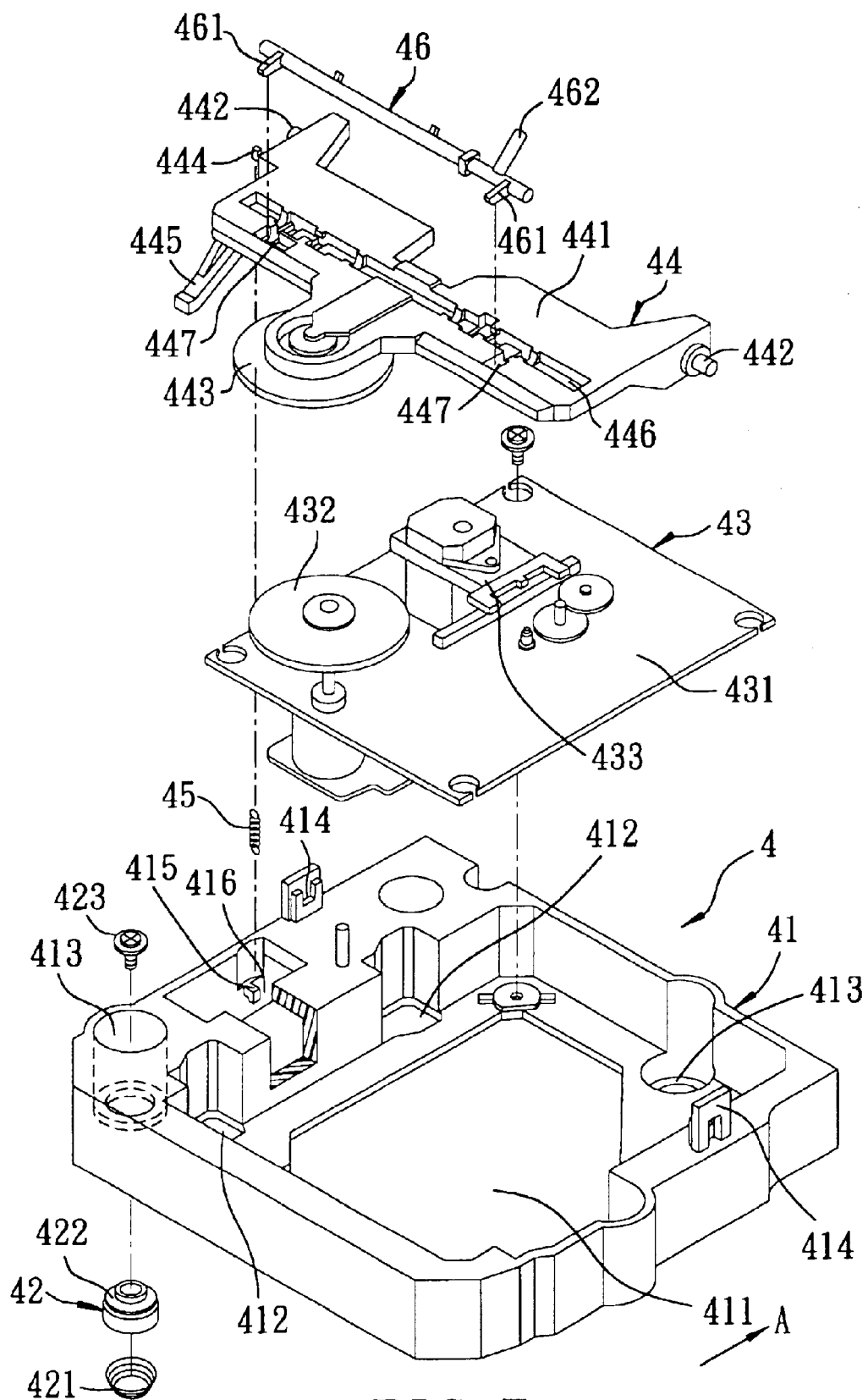
FIG. 7 is a partly exploded perspective view of the disk-loading device of the preferred embodiment.

(3) Referring to FIGS. 7, 19, and 20, the T-shaped retaining block 317 moves rearwardly from the narrow portion (412N) (see FIG. 20) of the slot 412 to the wide portion (412W) (see FIG. 19) of the slot 412. As such, the loading casing 41 is unlocked from the T-shaped retaining block 317, and is supported on the compression springs 421, thereby providing a shock absorbing effect to the large diameter optical disk 91 during rotation of the optical disk 91.

Figure 22:
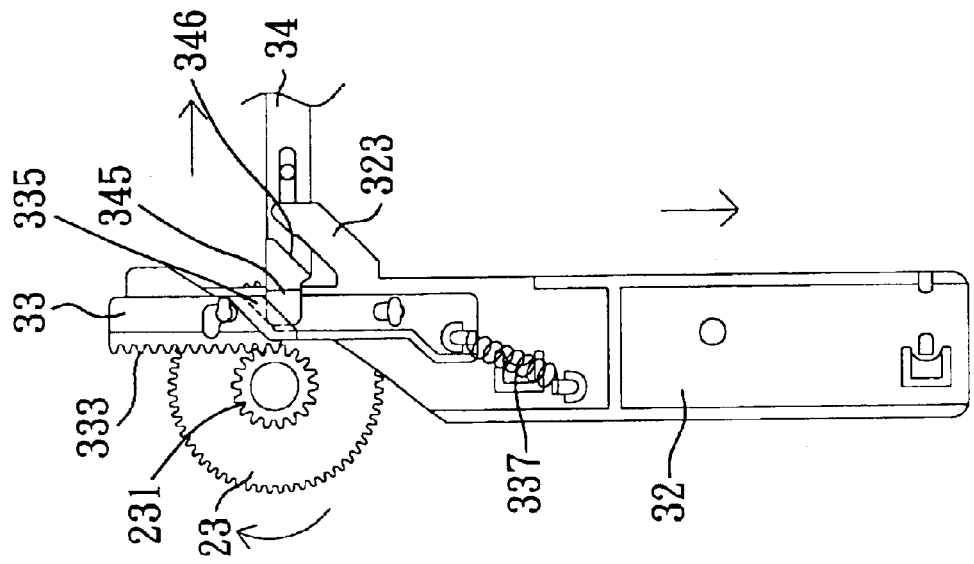
FIGS. 22 to 25 illustrate the operation of the power-supplying device and the driving device of the preferred embodiment when the large diameter optical disk is unloaded.

Referring to FIGS. 4, 5, 8, 10, and 11, when it is desired to eject the large diameter optical disk 91 from the apparatus, an eject key (not shown) is pressed to rotate the motor shaft 211 in a second direction that is opposite to the first direction so as to rotate the roller 37 in an unloading direction that is opposite to the loading direction. At this time, the gear unit 23 is rotated clockwise by the motor shaft 211 to move the transversely movable member 32 leftwardly due to engagement between the rack 322 and the large gear 231, as shown in FIG. 22. As such, the L-shaped retainers 326 move along the zigzag slots 316 from the position shown in FIG. 20 to that shown in FIG. 19 so as to move the longitudinally movable member 31 frontwardly. The frontward movement of the longitudinally movable member 31 results in the following actions:

(1) The swingable member 35 turns frontwardly about the insert hole 114 due to engagement between the insert rod 353 and the pivot hole 314. As such, the support rod 354 turns rearwardly to separate from the inclined slide slot 364 so that the swing seat 36 is pulled by the second return spring 30 to rotate about the pivot pins 361 in a direction that is opposite to the direction (C) (see FIG. 21), thereby turning the roller 37 upwardly to contact and support the large diameter optical disk 91 thereon.

(2) When the longitudinally movable member 31 moves frontwardly, the supporting block 318 contacts and supports the inclined abutment arm 445 thereon. As such, the pressing unit 44 turns upwardly to separate from the large-diameter optical disk 91 against that biasing action of the spring 45.

(3) The T-shaped retaining block 317 moves frontwardly from the wide portion (412W) (see FIG. 19) of the slot 412 to the narrow portion (412N) (see FIG. 20) of the slot 412. As such, the loading casing 41 is locked on the T-shaped retaining block 317 so that the compression springs 421 no longer provide any shock absorbing effect to the loading casing 41.

Figure 23:
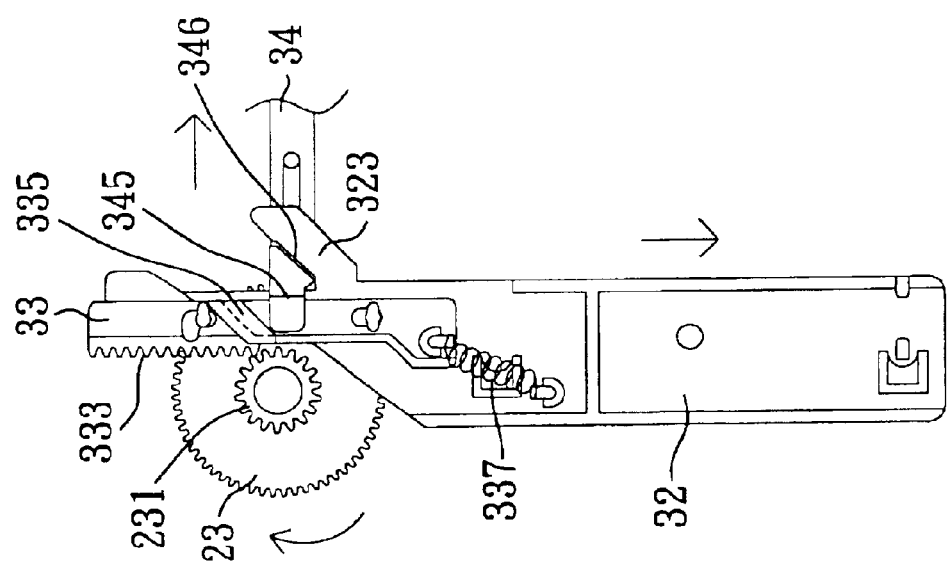
Figure 25:
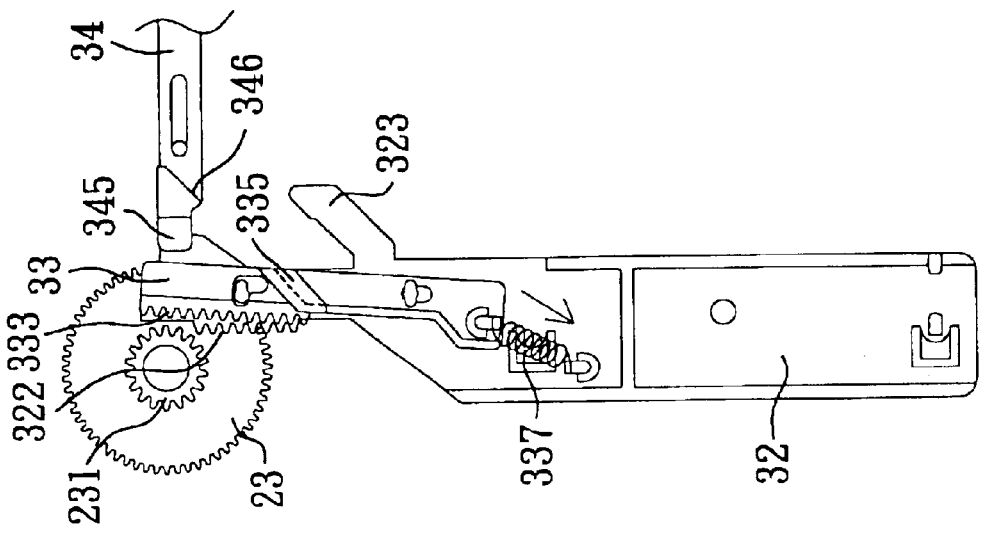
Figure 24:
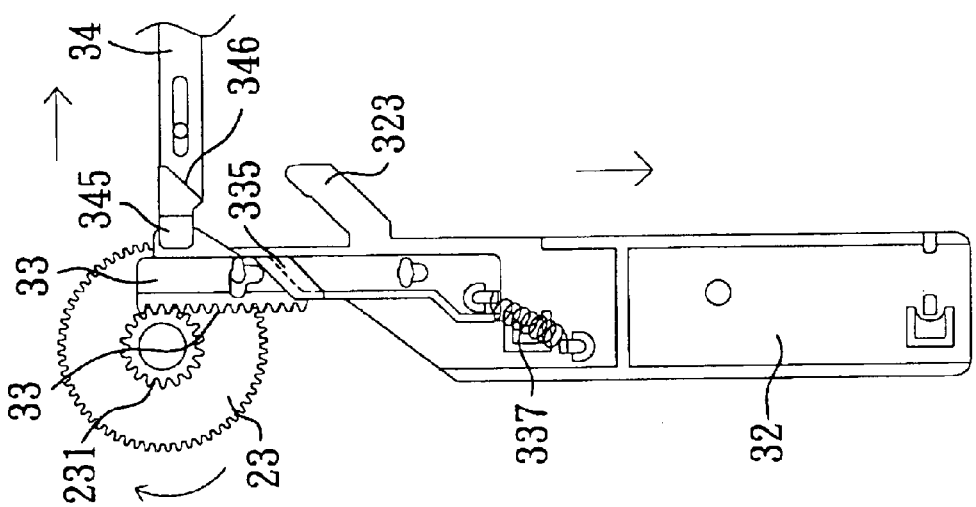

When the transversely movable member 32 moves leftwardly, the inclined right side surface 327 of the pushing block 323 separates from the inclined rear side surface 346 of the pushing head 345, as shown in FIG. 23. Subsequently, the inclined abutment wall 335 pushes the pushing head 345 rearwardly to the position shown in FIG. 24, after which the driving plate 33 is pulled by the coiled tension spring 337 to rotate and separate from the large gear 231.

When the large diameter optical disk 91 is moved frontwardly as a result of rotation of the roller 37, it contacts and pushes the left front limiting member 624 outwardly. Because the bent transverse rod 61 interconnects the left and right positioning plates 62, 63, when the front limiting member 624 is pushed, the retaining rod 634 separates from the front end hook portion 655 of the hook plate 65 so as to permit position restoration of all the elements of the disk-positioning device 6.

Because loading and unloading processes of the small diameter optical disk 92 (see FIG. 26) are similar to those of the large diameter optical disk 91, only the differences will be described in the succeeding paragraphs.

Figure 27:
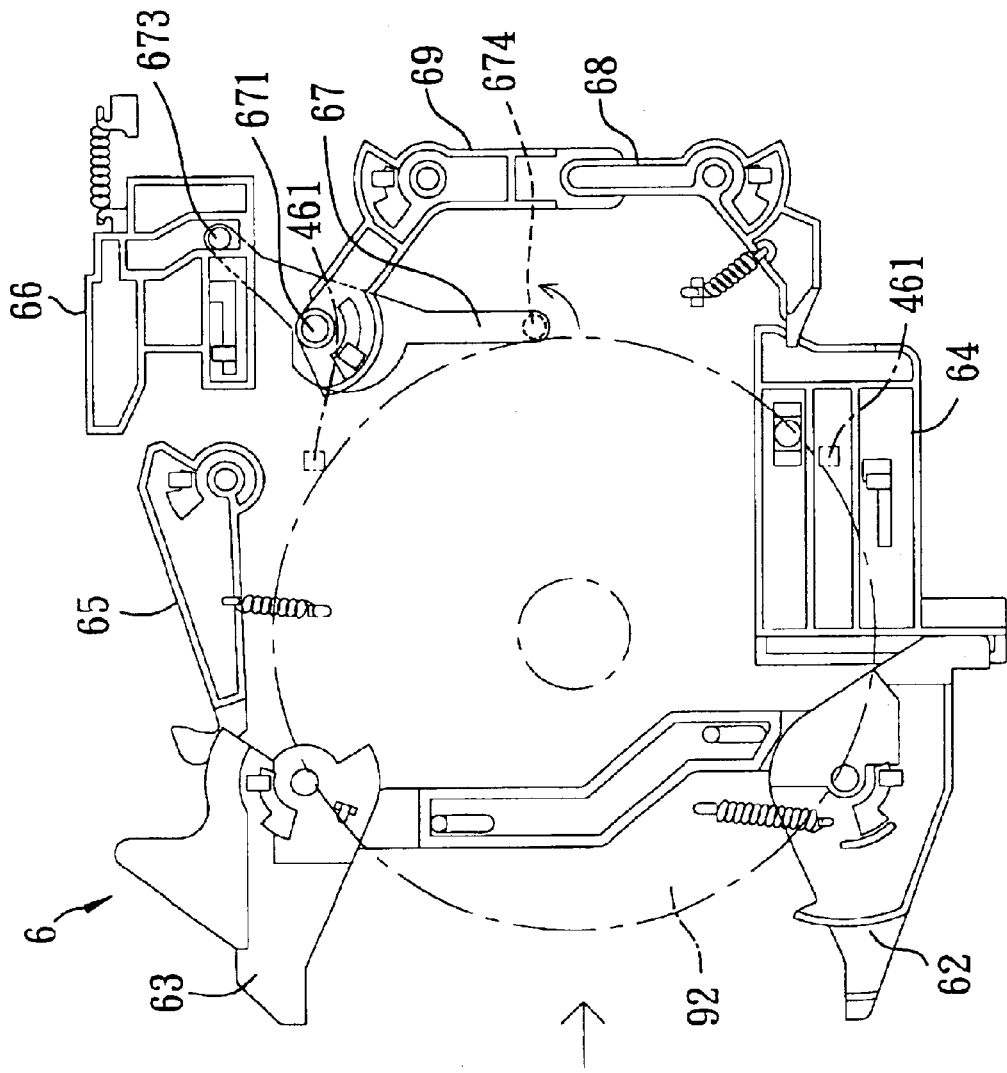
FIGS. 27 to 29 are fragmentary schematic top view of the preferred embodiment, illustrating the operation of the disk-positioning device when a small diameter optical disk is moved into the disk-positioning device.

Referring to FIGS. 26 and 27, because the distance between the left and right front limiting members 624, 633 is slightly smaller than the diameter of the small diameter optical disk 92, upon insertion of the small diameter optical disk 92 into the disk slot 10, the left and right front limiting members 624, 633 are pushed by the small diameter optical disk 92 to move away from the inner positions by a small distance such that the contact switch (M) (see FIG. 9) can activate the motor 21. Thereafter, the left and right front limiting members 624, 633 are restored to the inner positions by the spring 601.

Figure 28:
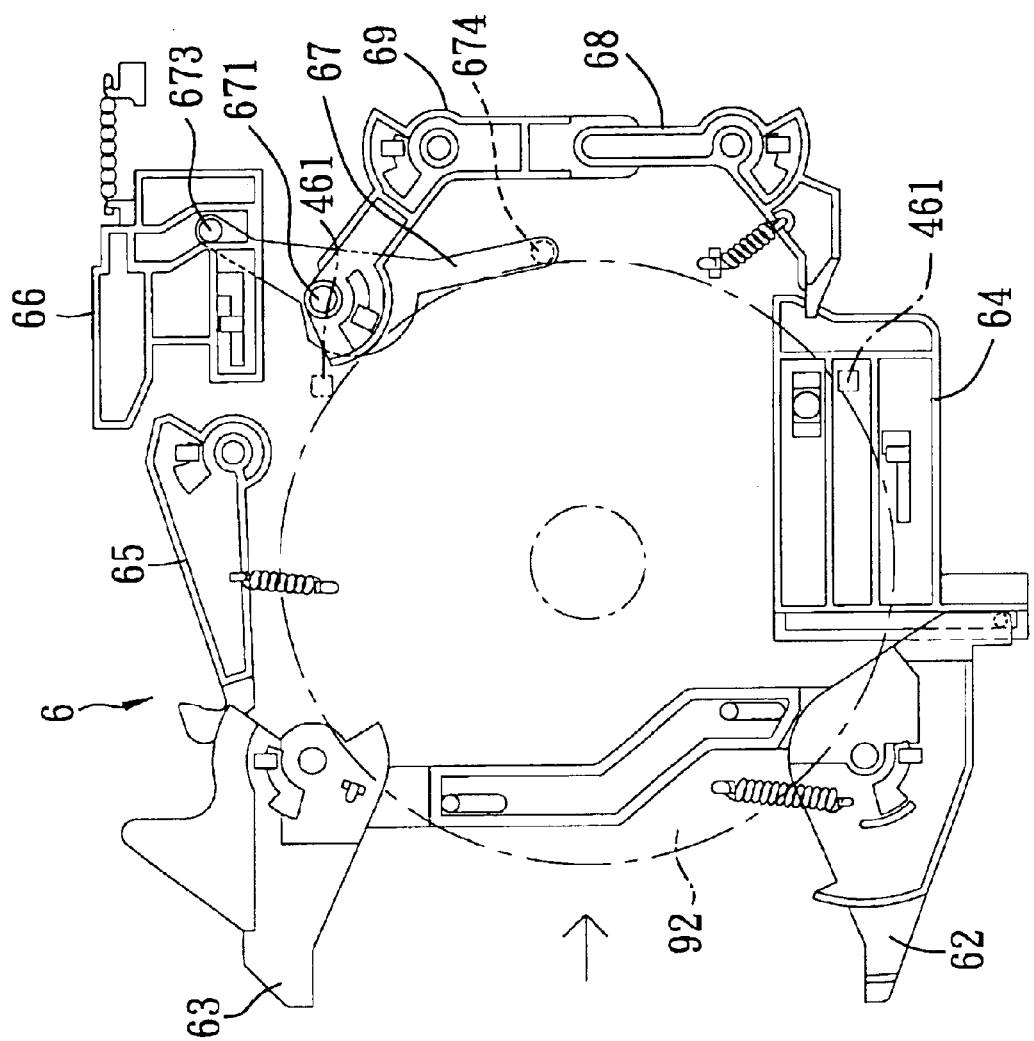

Because the distance between the rear limiting members 461 is slightly larger than the diameter of the small diameter optical disk 92, the small diameter optical disk 92 can be guided by the rear limiting members 461 to move rearwardly to the position shown in FIG. 28, where the small diameter optical disk 92 contacts the positioning member 674.

Figure 29:
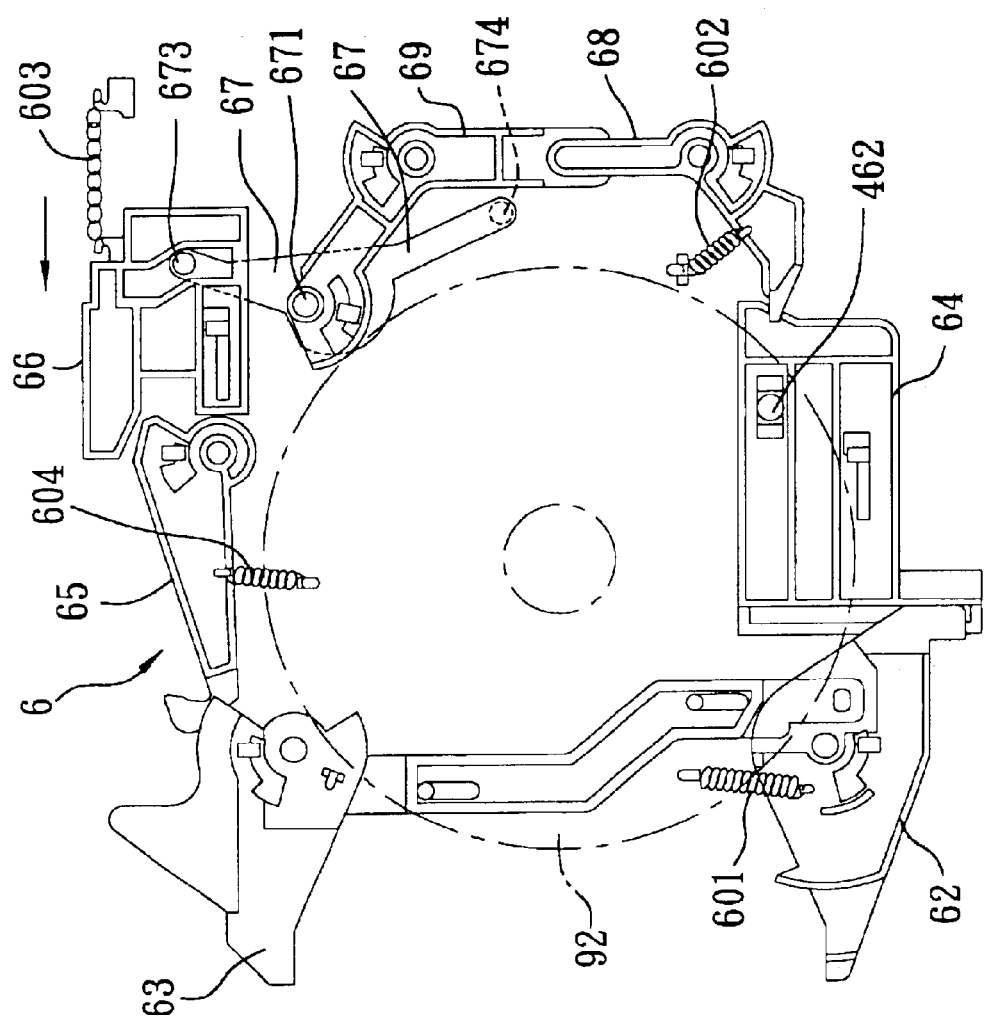

Subsequently, the small diameter optical disk 92 impels the positioning member 674 rearwardly so as to move the right slide plate 66 frontwardly. As such, the positioning member 674 is removed from the small diameter optical disk 92 in the same manner as the large diameter optical disk 91 (see FIG. 18), as shown in FIG. 29.

Figure 30:
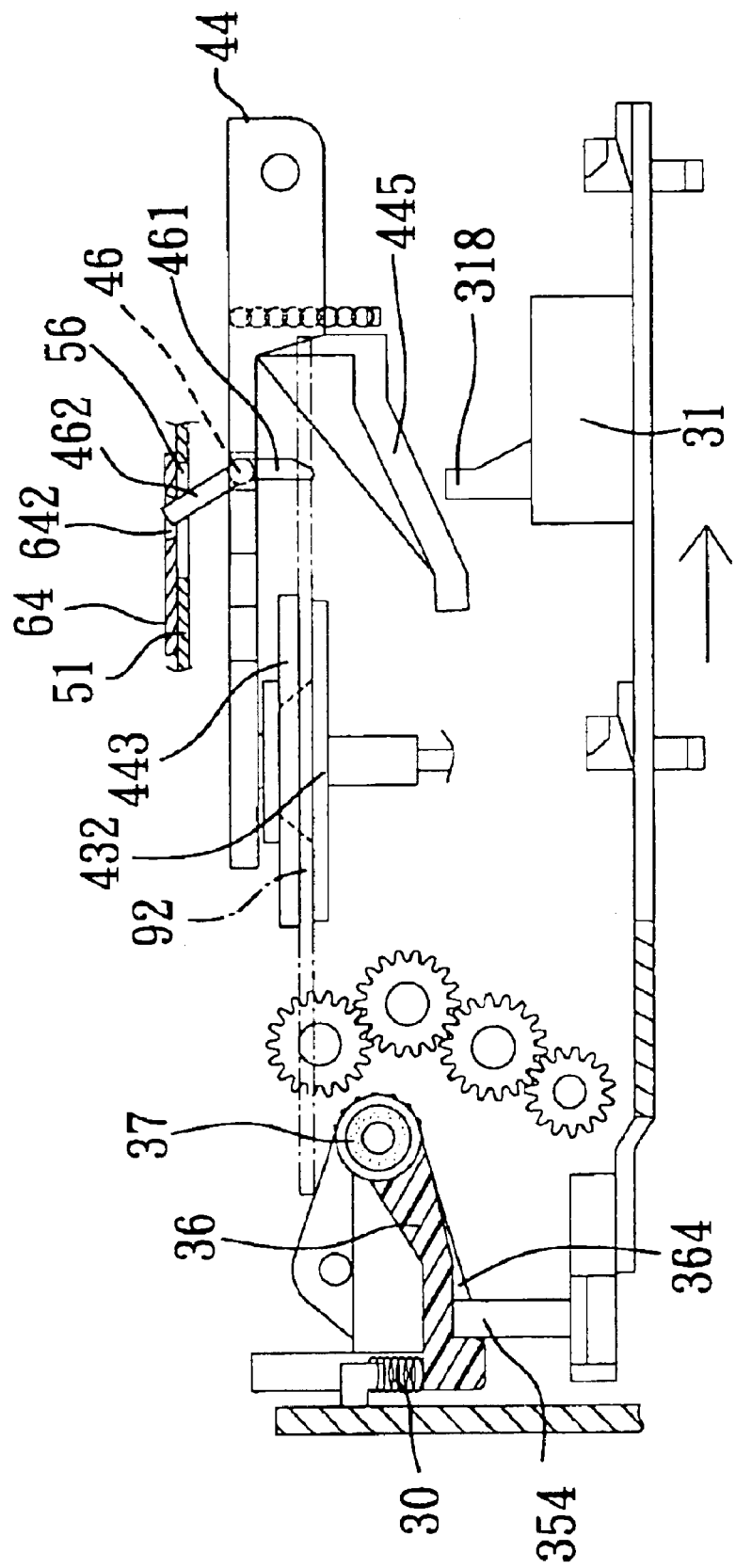
FIG. 30 is a fragmentary schematic sectional side view of the preferred embodiment, illustrating how the small diameter optical disk is clamped between the disk-supporting member and the pressing disk.

Finally, referring to FIG. 30, the roller 37 is removed from the small diameter optical disk 92, and the pressing disk 443 is turned to press the small diameter optical 5 disk 92 against the disk-supporting member 432.

With this invention thus explained, it is apparent that numerous modifications and variations can be made without departing from the scope and spirit of this invention. It is therefore intended that this invention be limited only as indicated by the appended claims.

I claim:

1. A slot-in type optical disk-loading apparatus comprising:
   a first housing;
   a second housing connected fixedly to said first housing to define a disk slot therebetween so as to permit insertion of an optical disk into said disk slot;
   a power-supplying device including a motor that is provided with a motor shaft which is rotatable in opposite first and second directions;
   a disk-loading device disposed between said first and second housings and including a disk holder unit, said disk holder unit including a disk-supporting member and a pressing disk, said disk-supporting member being adapted to support the optical disk thereon in such a manner that the optical disk is sleeved on said supporting member, said pressing disk being spaced apart from said disk-supporting member and being adapted to be movable to press the optical disk against said disk-supporting member;
   a driving device including a roller that is journalled between said first and second housings, that is adapted to contact frictionally the optical disk when the optical disk is inserted into said disk slot, and that is rotatable by said motor shaft in a loading direction and an unloading direction which are opposite to each other, said roller rotating in said loading direction so as to move the optical disk from said disk slot onto said disk-supporting member along a disk path when said motor shaft rotates in said first direction, said roller rotating in said unloading direction so as to unload the optical disk from said disk-supporting member to thereby eject the optical disk from said disk slot when said motor shaft rotates in said second direction;
   a motor-activating member for detecting presence of the optical disk and activating said motor so as to rotate said motor shaft in said first direction;
   a disk-positioning device disposed movably between said first and second housings and including a pair of left and right front limiting members, a pair of rear limiting members, and a positioning member, said left and right front limiting members being located behind said disk slot and in front of said rear limiting members and said positioning member, being biased to inner positions, where said first and second front limiting members are spaced apart from each other by a smaller distance so as to permit the optical disk to move through a space between said first and second front limiting members only when the optical disk has a standardized small diameter, and being adapted to be pushed by the optical disk, when the optical disk has a standardized large diameter, to move away from each other to outer positions, where said first and second front limiting members are spaced apart from each other by a larger distance so as to permit the optical disk to move rearwardly therebetween when the optical disk has the large diameter, until the optical disk moves to a rear limit position, where the optical disk is prevented by said positioning member to move further rearward and where said pressing disk is moved to press the optical disk against said disk-supporting member, said rear limiting members being disposed movably between said front limiting members and said positioning member, being spaced apart from each other by a distance that is slightly larger than the small diameter, and extending into said disk path so as to prevent the optical disk from moving through the disk path when the optical disk has the large diameter and so as to guide the optical disk to move to said rear limit position when the optical disk has the small diameter, said rear limiting members being removed from said disk path when said left and right front limiting members are moved from said inner positions to said outer positions.

2. The slot-in type optical disk-loading apparatus as claimed in claim 1, wherein said disk-loading device includes:
   a pressing plate disposed pivotally between said first and second housings and connected fixedly to said pressing disk, said pressing plate being formed with a positioning slot that has two parallel frontward extension portions; and
   a stop rod journalled within said positioning slot and formed integrally with said rear limiting members, said rear limiting members extending frontwardly and downwardly from said stop rod and rotatable from said disk slot to engage respectively said frontward extension portions of said positioning slot in said pressing plate when said front limiting members are disposed at said outer positions.

3. The slot-in type optical disk-loading apparatus as claimed in claim 1, wherein said left and right front limiting members are disposed pivotally on an assembly of said first and second housings.

* * * * *